US009949199B2

(12) United States Patent
Tanaka et al.

(10) Patent No.: US 9,949,199 B2
(45) Date of Patent: Apr. 17, 2018

(54) USER APPARATUS, COMMUNICATION CONTROL APPARATUS, AND ORIGINATION REJECTION CONTROL METHOD

(71) Applicant: NTT DOCOMO, INC., Tokyo (JP)

(72) Inventors: Itsuma Tanaka, Tokyo (JP); Shinya Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/310,656

(22) PCT Filed: May 15, 2015

(86) PCT No.: PCT/JP2015/064076
§ 371 (c)(1),
(2) Date: Nov. 11, 2016

(87) PCT Pub. No.: WO2015/174527
PCT Pub. Date: Nov. 19, 2015

(65) Prior Publication Data
US 2017/0078949 A1 Mar. 16, 2017

(30) Foreign Application Priority Data
May 16, 2014 (JP) ................................. 2014-102867

(51) Int. Cl.
*H04M 3/00* (2006.01)
*H04W 48/04* (2009.01)
(Continued)

(52) U.S. Cl.
CPC ........... *H04W 48/04* (2013.01); *H04W 48/02* (2013.01); *H04W 48/18* (2013.01);
(Continued)

(58) Field of Classification Search
CPC ..... H04W 48/04; H04W 48/02; H04W 48/18; H04W 52/0212; H04W 76/027; H04W 88/06; H04W 36/0022; Y02B 60/50
(Continued)

(56) References Cited

U.S. PATENT DOCUMENTS

| 7,024,179 B2 * | 4/2006 | Park | ....................... H04W 28/24 455/413 |
| 7,200,126 B2 * | 4/2007 | Lim | ................... H04W 36/0033 370/331 |

(Continued)

FOREIGN PATENT DOCUMENTS

JP        2012147436 A       8/2012

OTHER PUBLICATIONS

Office Action issued in corresponding Japanese Application No. 2016-519319, dated Mar. 28, 2017 (4 pages).
(Continued)

*Primary Examiner* — Marceau Milord
(74) *Attorney, Agent, or Firm* — Osha Liang LLP

(57) ABSTRACT

A user apparatus for use in a mobile communication network that supports a plurality of radio access technologies, including: a reception unit configured, when an origination request transmitted to the mobile communication network from the user apparatus that uses a first radio access technology is rejected, to receive an origination rejection signal including a timer value and an operation instruction from the mobile communication network; and an operation control unit configured to perform inhibition of re-origination based on the timer value included in the origination rejection signal that is received by the reception unit, wherein, in a case where the user apparatus changes a using radio access technology from the first radio access technology to a second radio access technology, the operation control unit determines
(Continued)

whether to inhibit re-origination based on the operation instruction included in the origination rejection signal.

15 Claims, 17 Drawing Sheets

(51) Int. Cl.
| | |
|---|---|
| *H04W 48/02* | (2009.01) |
| *H04W 48/18* | (2009.01) |
| *H04W 88/06* | (2009.01) |
| *H04W 76/02* | (2009.01) |
| *H04W 52/02* | (2009.01) |
| *H04W 36/00* | (2009.01) |

(52) U.S. Cl.
CPC ..... *H04W 52/0212* (2013.01); *H04W 76/027* (2013.01); *H04W 88/06* (2013.01); *H04W 36/0022* (2013.01); *Y02B 60/50* (2013.01)

(58) Field of Classification Search
USPC .................. 455/418, 564, 414.1, 423, 432.1
See application file for complete search history.

(56) References Cited

U.S. PATENT DOCUMENTS

| | | | | |
|---|---|---|---|---|
| 7,257,134 | B2* | 8/2007 | Yik .......................... | H04L 45/02 370/352 |
| 8,665,716 | B2* | 3/2014 | Niemi ............... | H04W 36/0022 370/230 |
| 9,179,499 | B1* | 11/2015 | Fang .................. | H04W 36/0088 |
| 9,521,526 | B2* | 12/2016 | Gellens .................... | H04W 4/12 |
| 2005/0261017 | A1* | 11/2005 | Vaittinen ............. | H04W 52/286 455/522 |
| 2010/0002582 | A1* | 1/2010 | Luft .................. | H04W 74/0866 370/230.1 |
| 2010/0202368 | A1* | 8/2010 | Hans .................... | H04M 3/5116 370/329 |
| 2012/0106332 | A1* | 5/2012 | Tiwari ................. | H04W 60/005 370/230 |
| 2012/0178449 | A1 | 7/2012 | Liao | |
| 2012/0294143 | A1* | 11/2012 | Niemi ............... | H04W 36/0022 370/230 |
| 2012/0294144 | A1* | 11/2012 | Niemi ............... | H04W 36/0022 370/230 |
| 2013/0100795 | A1* | 4/2013 | Zhao ................. | H04W 36/0016 370/216 |
| 2014/0018085 | A1* | 1/2014 | Young ............... | H04W 52/0235 455/450 |
| 2015/0003228 | A1* | 1/2015 | Choi ................... | H04W 76/028 370/216 |

OTHER PUBLICATIONS

European Search Report issued in corresponding European Application No. 15793529.7, dated Mar. 8, 2017 (9 pages).
Alcatel-Lucent, Alcatel-Lucent Shanghai Bell, Bell Canada, AT&T, Verizon, LG Electronics, Huawei, HiSilicon; "UE retry handling with optional network signalled timer"; 3GPP TSG-CT WG1 Meeting #86bis, C1-141311 (was C1-140947); Dubrovnik, Croatia; Mar. 31-Apr. 4, 2014 (18 pages).
Ericsson; "ESM Retry; Comparison between solutions"; 3GPP Draft, C1-142056; France; May 12, 2014 (10 pages).
International Search Report issued in PCT/JP2015/064076, dated Jul. 21, 2015 (1 page).
Written Opinion of the International Searching Authority issued in PCT/JP2015/064076, dated Jul. 21, 2015 (4 pages).
3GPP TS 24.301 V12.4.0; "3rd Generation Partnership Project; Technical Specification Group Core Network and Terminals; Non-Access-Stratum (NAS) protocol for Evolved Packet System (EPS); Stage 3 (Release 12)"; Mar. 2014 (362 pages).
3GPP TS 23.401 V12.4.0; "3rd Generation Partnership Project; Technical Specification Group Services and System Aspects; General Packet Radio Service (GPRS) enhancements for Evolved Universal Terrestrial Radio Access Network (E-UTRAN) access (Release 12)"; Mar. 2014 (302 pages).
3GPP TS 24.008 V12.5.0; "3rd Generation Partnership Project; Technical Specification Group Core Network and Terminals; Mobile radio interface Layer 3 specification; Core network protocols; Stage 3 (Release 12)"; Mar. 2014 (691 pages).
3GPP TS 23.060 V12.4.0; "3rd Generation Partnership Project; Technical Specification Group Services and System Aspects; General Packet Radio Service (GPRS); Service description; Stage 2 (Release 12)" Mar. 2014 (345 pages).
Office Action issued in the counterpart Singapore Patent Application No. 11201609459Q, dated Aug. 22, 2017 (6 pages).
Office Action issued in corresponding European Patent Application No. 15793529.7, dated Nov. 10, 2017 (5 pages).

* cited by examiner

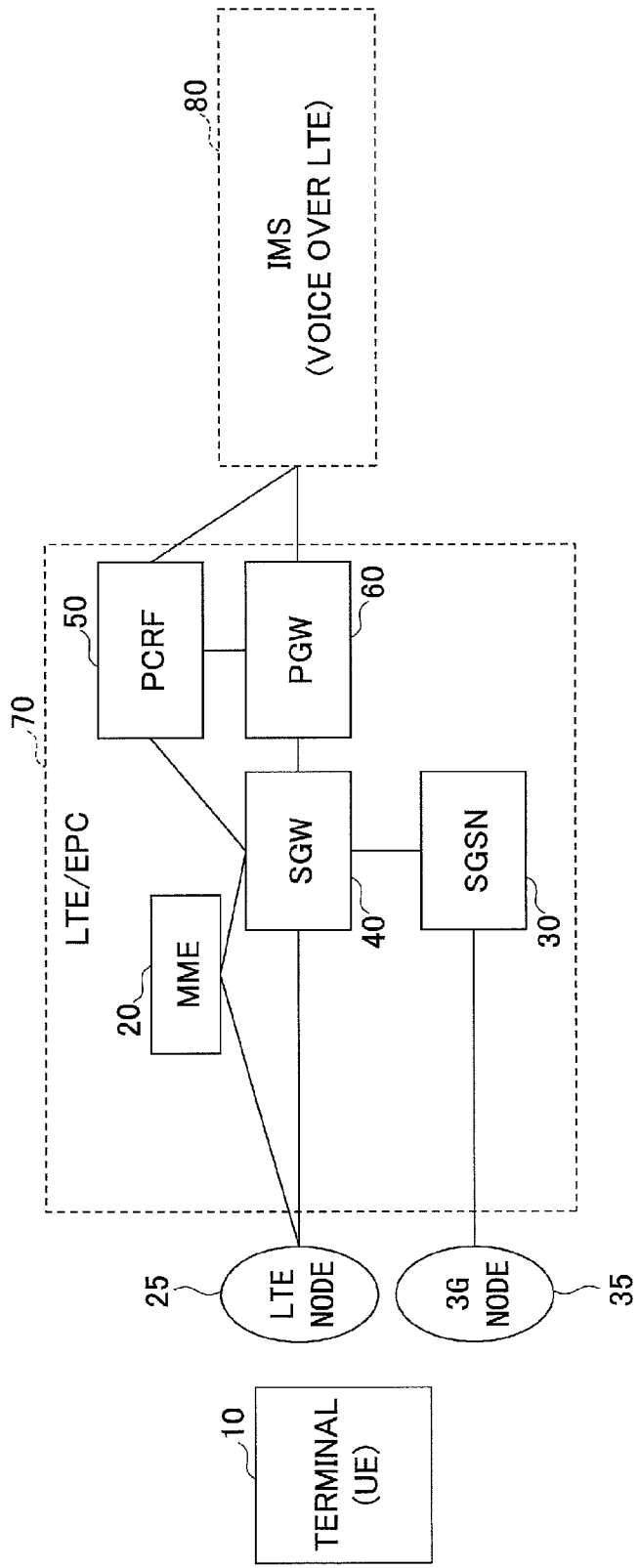

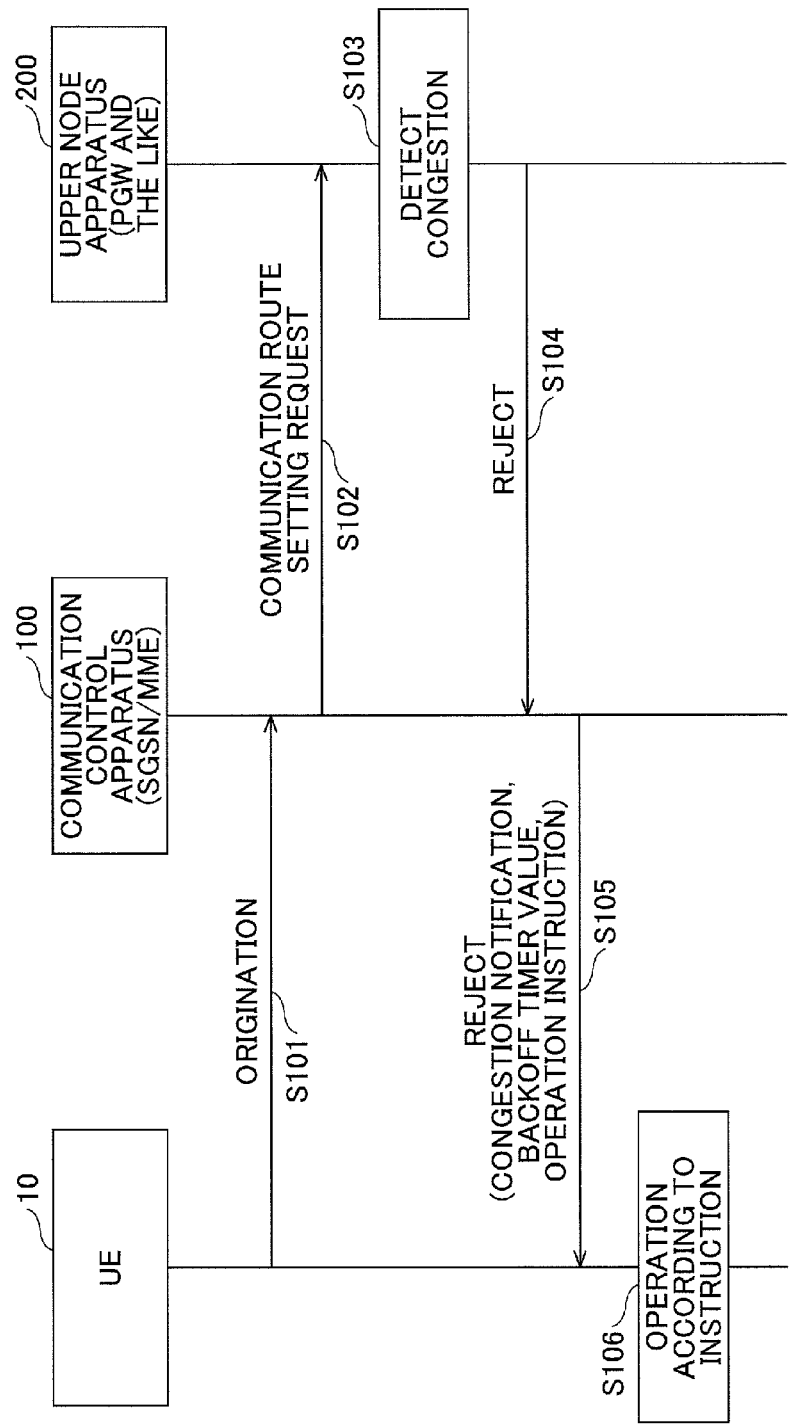

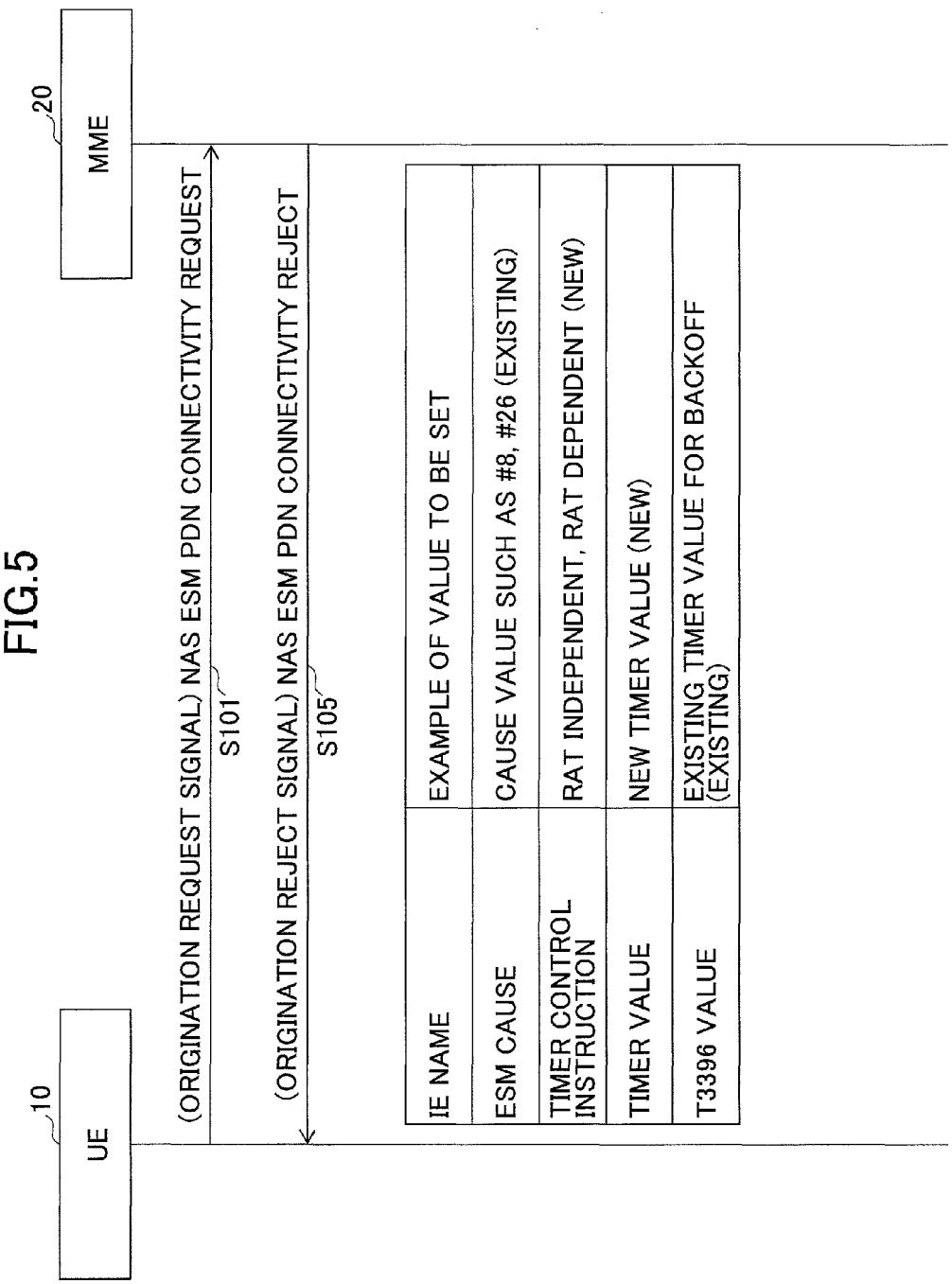

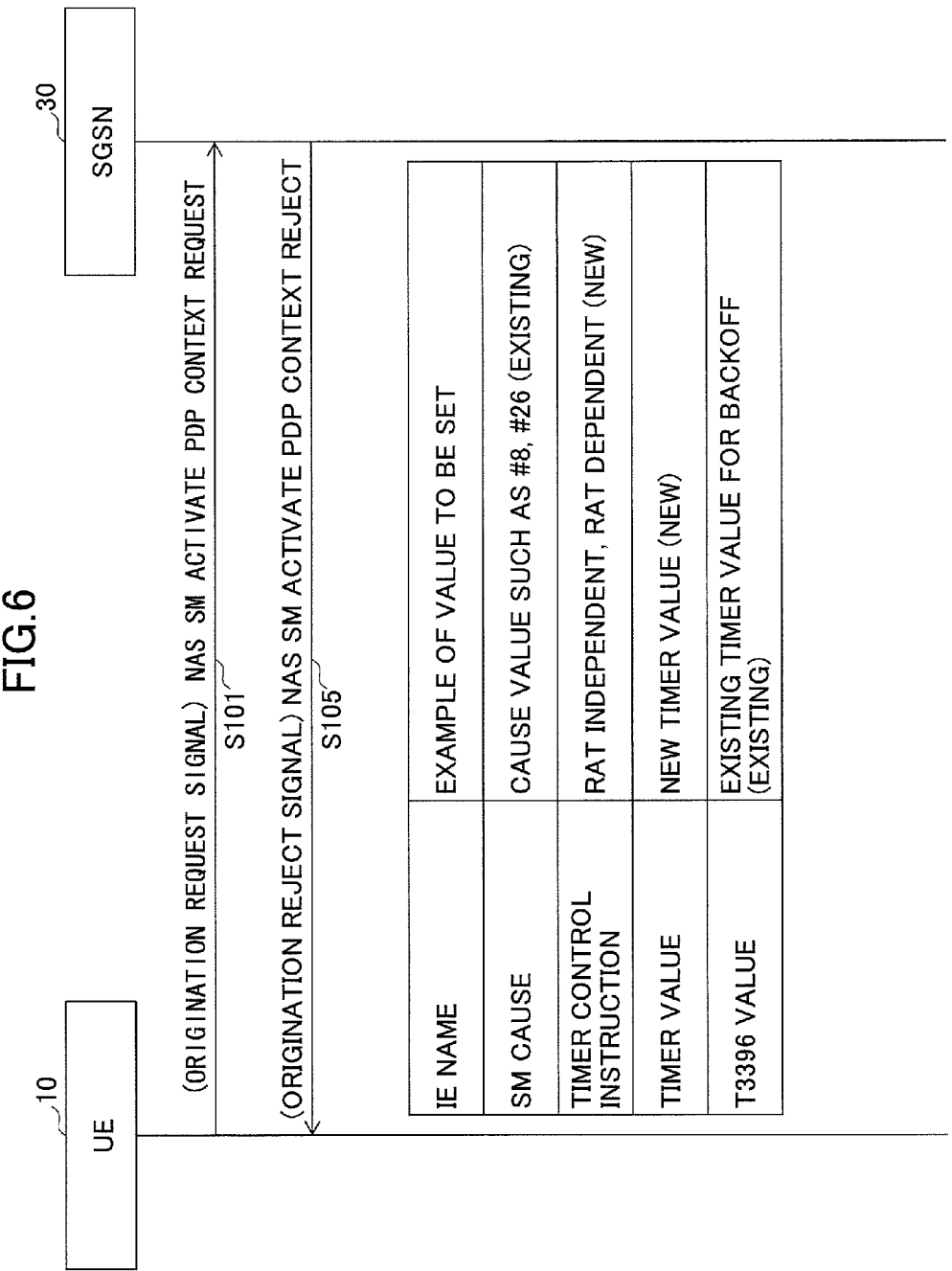

USER APPARATUS, COMMUNICATION CONTROL APPARATUS, AND ORIGINATION REJECTION CONTROL METHOD

TECHNICAL FIELD

The present invention relates to a technique for inhibiting re-origination from a terminal when an origination request by the terminal is rejected in a mobile communication network.

BACKGROUND ART

A mobile communication network that supports a radio access technology such as LTE or 3G or the like is generally provided with a function for keeping a state in which a terminal (to be referred to as UE (User Equipment) hereinafter) such as a smartphone can always perform communication. Operation related to such a function is called "Always-on".

A UE automatically performs re-origination when an origination request is rejected, for example, in order to keep the state in which communication can be always performed. However, if such a function is used as it is, the terminal repeatedly performs re-origination. Thus, there is a possibility in that the signal amount in the network increases to induce congestion and the like.

In order to avoid congestion due to re-origination as mentioned above, a concept of backoff timer for inhibiting re-origination for a certain period is introduced from Rel-10 for a specific Cause (origination reject cause) (non-patent document 1 and the like).

An example of origination reception control in the case where a backoff timer is used is described with reference to FIG. 1. As shown in FIG. 1, a UE 1 performs origination as shown in FIG. 1 (step 1). Since a network apparatus 2 (SGSN, MME and the like) detects congestion (step 2), the network apparatus 2 determines that it cannot accept the origination to return a Reject (origination reject signal) to the UE 1 (step 3). The Reject includes information (Cause value) indicating that the reason of the Reject is congestion, and a timer value of the backoff timer. As reasons of the Reject, various ones are defined as Causes (non-patent document 1 and the like), in which the above-mentioned "congestion" is an example of them.

The UE 1 that receives the Reject including the timer value does not perform re-origination to the same APN (Access Point Name) for the period of the notified timer value (step 4). By the way, when transmitting the Reject to a plurality of UEs, timer values are randomized for each UE so that it is possible to distribute timing of re-origination.

RELATED ART DOCUMENT

Non-Patent Document

[NON-PATENT DOCUMENT 1] 3GPP TS 24.301 V12.4.0 (2014-03)

[NON-PATENT DOCUMENT 2] 3GPP TS 23.401 V12.4.0 (2014-03)

[NON-PATENT DOCUMENT 3] 3GPP TS 24.008 V12.5.0 (2014-03)

[NON-PATENT DOCUMENT 4] 3GPP TS 23.060 V12.4.0 (2014-03)

SUMMARY OF THE INVENTION

Problem to be Solved by the Invention

As described above, the concept of the backoff timer is added to specific Causes from Rel-10. There are two types of Causes, which are a type that can inhibit re-origination for each RAT (Radio Access Technology) (in a RAT dependent manner) like SM/ESM Cause#66, and a type that inhibits re-origination independently of RAT (in a RAT independent manner) like Cause#27.

In re-origination inhibition of RAT dependent, for example, when a UE inhibits re-origination based on a timer by receiving a Reject while residing in LTE, if the UE performs RAT transition to transit from LTE to 3G, the UE can perform re-origination even when the timer remains.

On the other hand, in re-origination inhibition of RAT independent, for example, when the UE inhibits re-origination based on a timer by receiving a Reject while residing in LTE, even if the UE performs RAT transition to transit from LTE to 3G, the UE is still under management of the timer, so that the UE cannot perform re-origination as long as the timer remains.

Although the backoff timer is provided to a specific Cause currently, it is being considered to include a backoff timer in all Causes in 3GPP. In the case where a backoff timer is included in all Causes, whether to make a Cause to be RAT dependent or make it to be RAT independent varies according to operation policy of an operator. Occurrence of such a variation is described by taking a case where a backoff timer is applied to Cause#8 (Operator Determined Barring: abbreviated to "ODB") as an example. ODB corresponds to, for example, a case where user origination is rejected due to non-payment.

For example, in a case where different ODBs are applied for LTE and 3G in an operator 1, that is, in a case where charging contract is separated between LTE and 3G, when an operator 1 applies ODB in LTE for a user, the operator does not want the user to perform re-origination in LTE, but wants the user to perform re-origination in 3G. That is, for the operator 1, it is desirable that a backoff timer attached to the Cause#8 is RAT dependent On the other hand, in an operator 2, in a case where ODBs of LTE and 3G are linked, that is, in a case where charging contract is not separated between LTE and 3G, when the operator 2 applies ODB in LTE for a user, the operator 2 does not want the user to perform re-origination not only in LTE but also in 3G. That is, for the operator 2, it is desirable that the backoff timer attached to the Cause#8 is RAT independent. If a RAT dependent backoff timer is applied in the operator 2, when a UE transits from LTE, to which ODB is applied, to 3G, re-origination is performed so that operation of Reject is performed again. Therefore, waste occurs in signals and a battery.

The present invention is contrived in view of the above-mentioned points, and an object of the present invention is to provide a technique that enables to properly control operation of re-origination inhibition when a user apparatus performs RAT transition, in a mobile communication system that inhibits re-origination from the user apparatus by using a timer when origination from the user apparatus (UE) is rejected.

Means for Solving the Problem

According to an embodiment of the present invention, there is provided a user apparatus for use in a mobile communication network that supports a plurality of radio access technologies, including:

a reception unit configured, when an origination request transmitted to the mobile communication network from the user apparatus that uses a first radio access technology is rejected, to receive an origination rejection signal including a timer value and an operation instruction from the mobile communication network; and an operation control unit configured to perform inhibition of re-origination based on the timer value included in the origination rejection signal that is received by the reception unit, wherein, in a case where the user apparatus changes a using radio access technology from the first radio access technology to a second radio access technology, the operation control unit determines whether to inhibit re-origination based on the operation instruction included in the origination rejection signal.

Also, according to an embodiment of the present invention, there is provided a communication control apparatus corresponding to a first radio access technology in a mobile communication network that supports a plurality of radio access technologies, including:

a reception unit configured to receive an origination request transmitted from a user apparatus that uses the first radio access technology; and an origination rejection control unit configured, when rejecting the origination request, to generate an origination rejection signal including an operation instruction and a timer value for causing the user apparatus to inhibit re-origination, and to transmit the origination rejection signal to the user apparatus, wherein the operation instruction is an instruction that is used for causing the user apparatus to determine whether to inhibit re-origination in a case where the user apparatus changes a using radio access technology from the first radio access technology to a second radio access technology.

Also, according to an embodiment of the present invention, there is provided an origination rejection control method executed by a communication system including a communication control apparatus corresponding to a first radio access technology in a mobile communication network that supports a plurality of radio access technologies, and including a user apparatus, including:

a step in which the user apparatus that uses the first radio access technology transmits an origination request, and the communication control apparatus receives the origination request;

a step in which, when the communication control apparatus rejects the origination request, the communication control apparatus generates an origination rejection signal including an operation instruction and a timer value for causing the user apparatus to inhibit re-origination, and transmits the origination rejection signal to the user apparatus;

a step in which the user apparatus performs inhibition of re-origination by the first radio access technology based on the timer value included in the origination rejection signal, wherein, in a case where the user apparatus changes a using radio access technology from the first radio access technology to a second radio access technology, the user apparatus determines whether to inhibit re-origination based on the operation instruction included in the origination rejection signal.

Effect of the Present Invention

According to an embodiment of the present invention, there is provided a technique that enables to properly control operation of re-origination inhibition when a user apparatus performs RAT transition, in a mobile communication system that inhibits re-origination from the user apparatus by using a timer when origination from the user apparatus is rejected.

BRIEF DESCRIPTION OF THE DRAWINGS

FIG. 2 is a whole block diagram of a system of an embodiment of the present invention;

FIG. 3 is a diagram for explaining processing in an embodiment of the present invention;

FIG. 5 is a diagram showing a signal format example (LTE) in an operation instruction method 1;

FIG. 6 is a diagram showing a signal format example (3G) in an operation instruction method 1;

EMBODIMENTS FOR CARRYING OUT THE INVENTION

Figure 1:
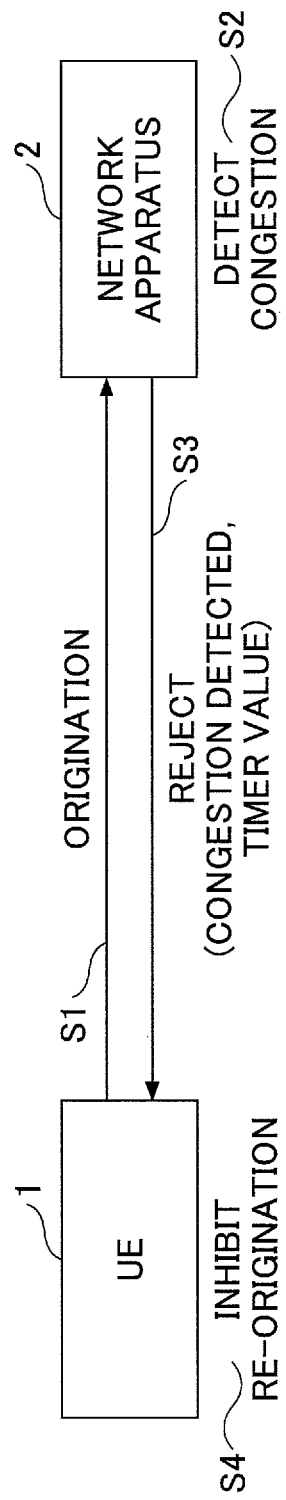
FIG. 1 is a diagram for explaining a conventional technique.

In the following, an embodiment of the present invention is described with reference to figures. The embodiment described below is merely an example, and the embodiment to which the present invention is applied is not limited to the embodiment below. For example, although LTE (E-UTRA) and 3G (UTRA) are taken as examples of RAT in the present embodiment, RAT that can be a target of the present invention is not limited to these. For example, as RATs, in addition to LTE and 3G, or, separately from these, it is possible to use, as targets, 2G (GSM), CDMA2000, radio LAN, WiMAX and the like. Also, in the present embodiment, although it is assumed to add a timer value and an operation instruction to each Cause, a timer value and an operation instruction may be added to a specific Cause.

System Whole Configuration Example

FIG. 2 shows a configuration example of a mobile communication system in an embodiment of the present invention. FIG. 2 shows an MME (Mobile Management Entity) 20, an SGW (Serving Gateway) 40, an SGSN (Serving General Packet Radio Service Support Node) 30, a PCRF (Policy and Charging Rules Function) 50, and a PGW (Packet Data Network Gateway) 60 as nodes that form an EPC (Evolved Packet Core) 70 of LTE. Also, in the example of FIG. 2, an IMS (IP Multimedia Subsystem) 80 that supports Voice over LTE is connected. The IMS 80 is an example of a packet data network (PDN) outside the core network.

A base station (eNodeB, which is described as LTE node in FIG. 2) of LTE is connected to the MME 20 and to the SGW 40. Also, a radio access apparatus (described as 3G node in FIG. 2) that includes an RNC and a NodeB is connected to the SGSN 30.

The LTE node 25, the MME 20 and the SGW 40 form an LTE radio access accommodation network, and the 3G node 35, the SGSN 30 and the SGW 40 form a 3G radio access accommodation network. By the way, a network including the EPC 70, the LTE node 25 and the 3G node 35 may be referred to as a mobile communication network supporting a plurality of RATs.

The UE 10 is assumed to be a smartphone, a mobile phone and the like. But, the UE 10 is not limited to these, and it may be a fixed terminal. Outline of functions of apparatuses that form the EPC 70 is as follows.

The MME 20 is an exchange that accommodates eNodeB, and that provides mobility control, bearer control functions and the like. The SGSN 30 is a packet exchange that accommodates 2G(UTRAN)/3G(GERAN) accesses. The SGW 40 is a residing packet exchange that accommodates the 3GPP access system. The PGW 60 is a connection point with the IMS platform, and is a packet exchange that performs assignment of an IP address and packet transfer to the SGW 40 and the like. The PGW 60 also performs QoS control, bearer setting control and the like in cooperation with the PCRF 50. The PCRF 50 is a logical node that performs control for QoS and charging of user data transfer.

In the present embodiment, the UE 10, the SGSN 30 and the MME 20 are provided with functions of the present invention. By the way, in the network side, an apparatus other than the SGSN 30 and the MME 20 may be provided with functions of the present invention. That is, an apparatus other than the SGSN 30 and the MME 20 may function as an after-mentioned communication control apparatus 100.

System Operation Outline

Next, outline of operation of the communication system in an embodiment of the present invention is described with reference to FIG. 3 and FIG. 4. In FIG. 3, the communication control apparatus 100 corresponds to the SGSN 30 or the MME 20, and the upper layer node apparatus 200 corresponds to the PGW 60 or a GGSN of 3G. However, such a functional segmentation is merely an example.

In FIG. 3, first, the UE 10 performs origination by transmitting an origination request signal (step 101).

The communication control apparatus 100 that receives the origination request signal transmits a communication route setting request to the upper node apparatus 200 (step 102). In the example of FIG. 3, the upper node apparatus 200 that receives the communication route setting request detects congestion of the network (step 103), so that the upper node apparatus 200 transmits a Reject signal, to the communication control apparatus 100, indicating that the request cannot be accepted (step 104).

The communication control apparatus 100 that receives the Reject signal from the upper node apparatus 200 ascertains network congestion by receiving the Reject signal to determine that the origination request from the UE 10 cannot be accepted, so that the communication control apparatus 100 transmits a Reject signal to the UE 10 (step 105). By the way, there is a case where the communication control apparatus 100 detects congestion, or a case where the communication control apparatus 100 is notified of congestion from the upper node apparatus 200 beforehand. In such a case, the process does not proceed to step 102, and after origination request of step 101, the Reject signal transmission of step 105 is performed.

In the example shown in FIG. 3, the Reject signal transmitted to the UE 10 includes a value indicating a cause of the Reject (Cause value), a backoff timer value (to be referred to as timer value hereinafter), and an operation instruction. The operation instruction is information instructing "RAT dependent" or "RAT independent".

The UE 10 that receives the Reject signal performs operation of re-origination inhibition in accordance with the timer value and the operation instruction (step 106).

Figure 4A:
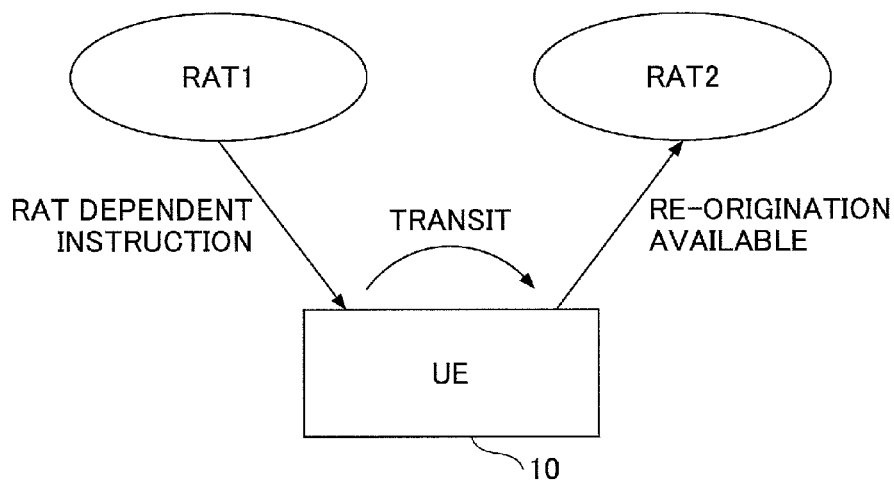
FIG. 4A is a diagram for explaining processing in an embodiment of the present invention.

Outline of operation of the UE 10 that receives the Reject signal is described with reference to FIGS. 4A and 4B. As shown in FIG. 4A, in a case where the UE 10 residing in a RAT1 (LTE, for example) receives a Reject signal including an operation instruction of "RAT dependent" from the communication control apparatus 100 of the RAT1, the UE 10 does not perform re-origination to the same APN for a period of the timer value after receiving the Reject signal. That is, the UE 10 starts a timer of the timer value when receiving the Reject signal, and the UE 10 does not perform re-origination until the timer expires. Here, the UE 10 that receives the Reject signal changes RAT from RAT1 to RAT2 (3G, for example). At this time, in accordance with the "RAT dependent" operation instruction, the UE 10 can perform re-origination in the RAT2 irrespective of whether the timer has expired or not.

In the above-mentioned description, that the UE 10 resides in the RAT1 means that the UE 10 performs radio communication using the RAT1 (radio access technology 1). Thus, "residing in RAT1" may be replaced with "using RAT1". Same applies to RAT2.

Figure 4B:
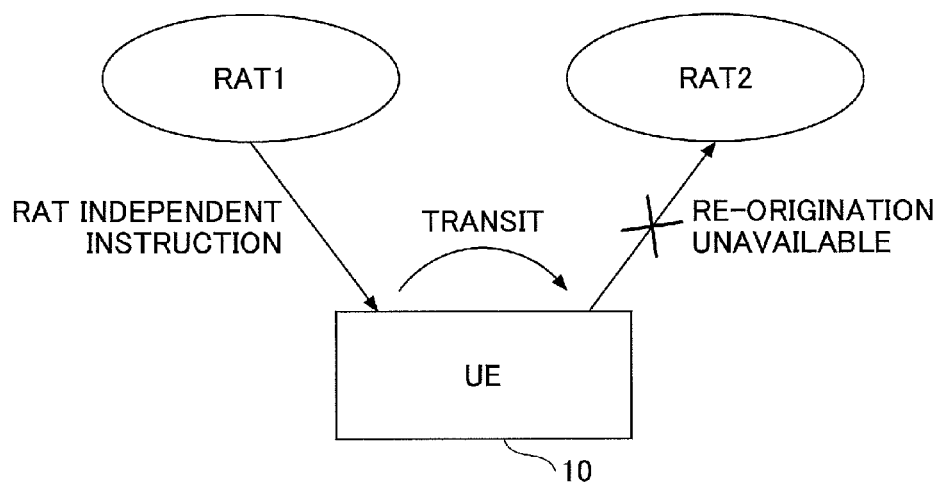
FIG. 4B is a diagram for explaining processing in an embodiment of the present invention.

As shown in FIG. 4B, in a case where the UE 10 residing in the RAT1 (LTE, for example) receives a Reject signal including an operation instruction of "RAT independent" from the communication control apparatus of the RAT1, the UE 10 does not perform re-origination to the same APN for a period of the timer value after receiving the Reject signal. That is, the UE 10 starts a timer of the timer value when receiving the Reject signal, and the UE 10 does not perform re-origination until the timer expires. Here, the UE 10 that receives the Reject signal changes RAT from RAT1 to RAT2 (3G, for example). At this time, in accordance with the "RAT independent" operation instruction, the UE 10 follows control of the timer based on the timer value received in the RAT1. That is, if the timer has not expired, the UE 10 cannot perform re-origination, and if the timer has expired, the UE 10 can perform re-origination.

By the way, as a result of performing re-origination after RAT transition, if the UE 10 receives a Reject signal including a timer value and an operation instruction, for example, the previous timer value and operation instruction are overwritten by the newly received timer value and operation instruction. That is, the previous timer value and operation instruction are deleted, and are replaced with the newly received timer value and operation instruction.

Detailed Example of Operation Instruction

In the present embodiment, as an operation instruction method for instructing operation of RAT dependent/RAT independent from the communication control apparatus 100 to the UE 10, following operation instruction method 1 and operation instruction method 2 can be used in the present embodiment.

<Operation Instruction Method 1>

In the operation instruction method 1, a new information element (new IE) is added to a format of an existing Reject signal. That is, an IE for designating "RAT dependent" or "RAT independent" is added. Also, as described later, in consideration of the case for instructing a plurality of timer values, a new information element for a timer value may be added.

Default operation in the case where a new information element is not set to the signal may be either "RAT dependent" or "RAT independent".

FIG. 5 shows a format example of an origination Reject signal in LTE in the operation instruction method 1. As shown in FIG. 5, "NAS ESM PDN Connectivity Request" is transmitted as an origination request signal from the UE 10 to the MME 20 (step 101). The MME 20 that determines not to accept the origination transmits "NAS ESM PDN Connectivity Reject" to the UE 10 as an origination Reject signal (step 105).

The origination Reject signal includes IEs shown in FIG. 5. In the IEs shown in FIG. 5, Timer control instruction and Timer Value are new information elements. The setting value in the Timer control instruction may be Boolean type, or may be Enumerated type (example: 0-independent, 1-LTE limited, 2-3G limited).

FIG. 6 shows a format example of an origination Reject signal in 3G in the operation instruction method 1. As shown in FIG. 6, "NAS SM Activate PDP Context Request" is transmitted as an origination request signal from the UE 10 to the SGSN 30 (step 101). The SGSN 30 that determines not to accept the origination transmits "NAS SM Activate PDP Context Reject" to the UE 10 as an origination Reject signal (step 105).

The origination Reject signal includes IEs shown in FIG. 6. In the IEs shown in FIG. 6, Timer control instruction and Timer Value are new information elements. The setting value in the Timer control instruction may be Boolean type, or may be Enumerated type (example: 0-independent, 1-LTE limited, 2-3G limited).

It is not essential to provide a new information element so as to notify of an operation instruction. Like the backoff timer operation example 1-2 described later, operation instruction may be performed implicitly by notifying of a timer value.

<Operation Instruction Method 2>

In the operation instruction method 2, operation of RAT dependent or RAT independent is instructed by a Cause value. That is, a set of new Cause values are added as a copy of existing Causes, so that it is defined that an existing value is RAT independent (or RAT dependent), and a new value is RAT dependent (or RAT independent).

Figure 7:
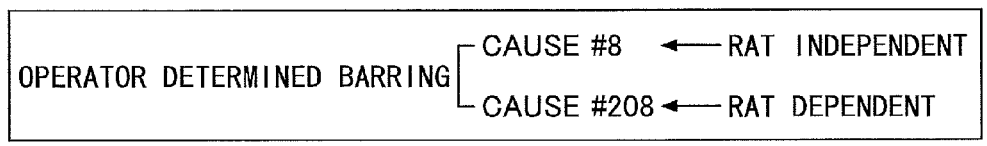
FIG. 7 is a diagram for explaining an operation instruction method 2.

For example, as shown in FIG. 7, #208 is added to existing #8 as a Cause value of "Operator Determined Barring". In the case of being defined like FIG. 7, when the UE 10 receives the Cause#8, the UE 10 performs operation of RAT independent. When the UE 10 receives the Cause#208, the UE 10 performs operation of RAT dependent, Concrete Example of Backoff Timer Operation In the present embodiment, as concrete examples of operation of the backoff timer, there are following four backoff timer operation examples. In the following, each of them is described. These operation examples will be described later in more detail with reference to flowcharts. As to both of the following operation examples 1-1 and 1-2, a RAT independent timer value and a RAT dependent timer value are defined, so they are put together as operation examples 1-1 and 1-2.

<Backoff Timer Operation Example 1-1>

In the backoff timer operation example 1-1, the communication control apparatus 100 notifies the UE 10 of a RAT independent timer value and a RAT dependent timer value (an LTE timer value and a 3G timer value in the present embodiment). Then, the UE 10 determines a timer value to use according to content of an operation instruction (RAT dependent/RAT independent).

For example, in a case where the UE 10 receives a RAT dependent instruction when the UE 10 is residing in LTE, the UE 10 performs re-origination inhibition control using an LTE timer value. Also, when the UE 10 receives a RAT independent instruction, the UE 10 performs re-origination inhibition control using a RAT independent timer value.

<Backoff Timer Operation Example 1-2>

In the backoff timer operation example 1-2, the communication control apparatus 100 notifies the UE 10 of any of a RAT independent timer value and a RAT dependent timer value (an LTE timer value and a 3G timer value in the present embodiment). However, the communication control apparatus 100 does not notify of an operation instruction using a new information element. The UE 10 determines an operation instruction (RAT dependent/RAT independent) based on presence or absence of a timer value.

For example, in a case where the UE 10 is residing in LTE, when the UE 10 receives a RAT dependent timer value without receiving a RAT independent timer value, the UE 10 interprets it as an operation instruction of RAT dependent to perform re-origination inhibition control using the RAT dependent timer value (LTE timer value). Also, when the UE 10 receives a RAT independent timer value without receiving a RAT dependent timer value, the UE 10 interprets it as an operation instruction of RAT independent to perform re-origination inhibition control using the RAT independent timer value.

By the way, in the case where the communication control apparatus 100 transmits a RAT dependent timer value to the UE 10, the communication control apparatus 100 may transmit only one timer value corresponding to a RAT where the UE 10 resides without transmitting both of the LTE timer value and the 3G timer value. For example, when the communication control apparatus 100 instructs RAT dependent while residing in LTE, the communication control apparatus 100 may transmit only an LTE timer value, and when the communication control apparatus 100 instructs RAT dependent while residing in 3G, the communication control apparatus 100 may transmit only a 3G timer value.

<Backoff Timer Operation Example 2>

In the backoff timer operation example 2, the communication control apparatus 100 notifies the UE 10 of one timer value. Then, the UE 10 performs re-origination inhibition control using the timer value according to content of the operation instruction (RAT dependent/RAT independent).

For example, when the UE 10 receives a RAT independent instruction, the UE 10 starts the timer for counting a period of the timer value to start re-origination inhibition, and then, the UE 10 continues re-origination inhibition without stopping the timer even when the UE 10 performs RAT transition before timer expiration. Also, when the UE 10 receives a RAT dependent instruction, the UE 10 starts the timer for counting a period of the timer value to start re-origination inhibition, but, when the UE 10 performs RAT transition before timer expiration, the UE 10 performs re-origination in a RAT of the transition destination by stopping the timer.

<Backoff Timer Operation Example 3>

In the backoff timer operation example 3, the communication control apparatus 10 notifies the UE 10 of only RAT dependent timer values (an LTE timer value and a 3G timer value in the present embodiment). Then, the UE 10 determines a timer value to use according to content of an operation instruction (RAT dependent/RAT independent).

When the UE 10 receives a RAT dependent instruction, the UE 10 starts re-origination inhibition by starting a timer for counting a period of the timer value of the RAT (example: an LTE timer value if LTE). When the UE 10 performs RAT transition before timer expiration, the UE 10 stops the timer to perform re-origination in a RAT of the transition destination.

When the UE 10 receives a RAT independent instruction, the UE 10 starts timers of both RATs at the same time to perform re-origination inhibition control in accordance with a timer of a RAT where the UE 10 is residing. For example, in a case where the UE 10 resides in LTE (in a case where the UE 10 resides in LTE from the start or the UE 10 has transited from 3G to LTE), when the timer of LTE expires, the UE 10 ends re-origination inhibition even when the timer of 3G has not yet expired. Also, for example, when the UE 10 transits from LTE to 3G in a state where the timer of 3G has not yet expired, the UE 10 inhibits re-origination in 3G.

Apparatus Configuration Example, Operation Flow

<Communication Control Apparatus 100>

Figure 8:
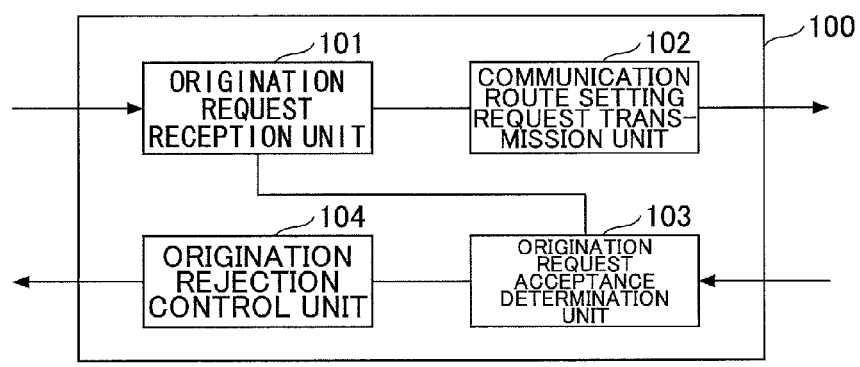
FIG. 8 is a functional block diagram of a communication control apparatus 100 in an embodiment of the present invention.

FIG. 8 shows a functional configuration of the communication control apparatus 100 in an embodiment of the present invention. FIG. 8 mainly shows functions, related to the present embodiment, to transmit a Reject signal by detecting a Reject cause (congestion and the like) in functions of an apparatus (MME 20 or SGSN 30 in the present embodiment) that functions as the communication control apparatus 100. Also, actual functional configuration of the communication control apparatus 100 varies depending on whether it is the MME 20 or the SGSN 30. However, functions of the present embodiment are basically the same between them, and are as shown in FIG. 8.

As shown in FIG. 8, the communication control apparatus 100 includes an origination request reception unit 101, a communication route setting request transmission unit 102, an origination request acceptance determination unit 103, and an origination rejection control unit 104.

The origination request reception unit 101 receives an origination request signal from the UE 10. The communication route setting request transmission unit 102 transmits a communication route setting request (example: PDP context setting request, bearer setting request) to the upper node apparatus 200 in response to receiving an origination request signal from the UE 10.

The origination request acceptance determination unit 103 determines whether to accept or not an origination request received from the UE 10 based on information obtained and managed by the communication control apparatus 100, information received from the upper node apparatus 200 beforehand, response for a communication route setting request from the upper node apparatus 200, and the like.

For example, when the origination request acceptance determination unit 103 identifies that a user of an origination source of the origination request is a user to which a communication service cannot be provided based on user information and the like, the origination request acceptance determination unit 103 determines not to accept the origination request for the UE 10 of the origination source of the origination request, to notify the origination rejection control unit 104 that it is not accepted. Also, for example, the origination request acceptance determination unit 103 determines not to accept the origination request for the UE 10 of the origination source of the origination request by detecting congestion, so that the origination request acceptance determination unit 103 notifies the origination rejection control unit 104 that it is not accepted. By the way, when accepting the origination request, a communication route is established, and a normal response is returned to a transmission source of the origination request.

In a case where an origination request for the UE 10 of the origination source of the origination request is not accepted, the origination rejection control unit 104 generates an origination Reject signal including a Cause value indicating rejection cause, a timer value, and an operation instruction, and transmits it to the UE 10. As described before, there is a case where the operation instruction is not included.

As to the timer value, for example, depending on which one is applied from among the before-mentioned backoff timer operation examples 1-1, 1-2, 2 and 3, necessary number and types of timer value(s) is (are) transmitted. Also, as to a value of the timer value, a value that is predetermined for each RAT and/or for each Cause may be used, or a value dynamically determined based on congestion degree and the like of UEs may be used.

As to content of the operation instruction (RAT dependent or RAT independent), for example, a value that is predetermined for each RAT and/or for each Cause may be used, or a value determined by other methods may be used.

<UE 10>

Figure 9:
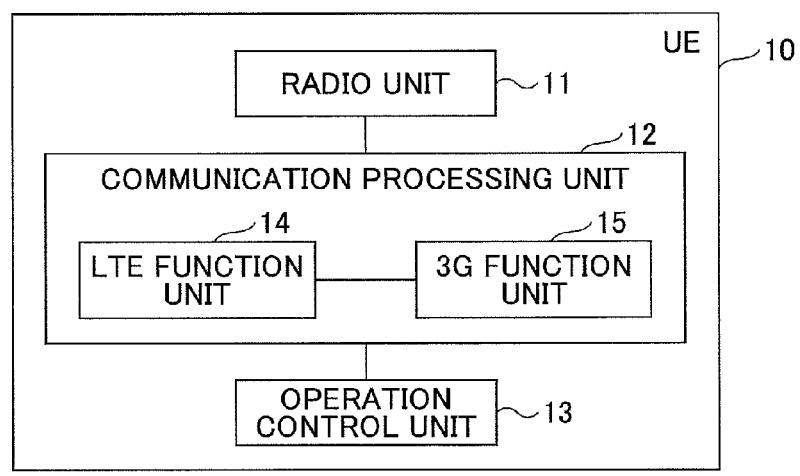
FIG. 9 is a functional block diagram of a UE 10 in an embodiment of the present invention.

FIG. 9 shows a functional configuration of the UE 10 in an embodiment of the present invention. As shown in FIG. 9, the UE 10 includes a radio unit 11, a communication processing unit 12, and an operation control unit 13, wherein the communication processing unit 12 includes an LTE function unit 14 and a 3G function unit 15. By the way, FIG. 9 only shows functional units related to the present embodiment in a UE. Also, it is merely an example that the communication processing unit 12 includes the LTE function unit 14 and the 3G function unit 15. The communication processing unit 12 may include functional units corresponding to more RATs.

The radio unit 11 includes an antenna and a high frequency LSI and the like, and includes a function for transmitting a signal generated in the communication processing unit 12 by radio, and passing a signal received by radio to the communication processing unit 12, and the like.

The communication processing unit 12 may be referred to as a baseband unit, which performs conversion (modulation/demodulation) between a packet and a signal carried by radio (OFDM signal, WCDMA signal and the like). The communication processing unit 12 includes the LTE function unit 14 and the 3G function unit 15, in which the LTE function unit 14 performs processing of an LTE signal and the 3G function unit 15 performs processing of a 3G signal. The communication processing unit 12 also performs processing of RAT transition and the like (Inter-RAT cell reselection and the like).

The operation control unit 13 performs operation control in the present embodiment. That is, the operation control unit 13 performs generation and transmission (passing to the communication processing unit 12) of an origination request signal, reception (receiving from the communication processing unit 12) and analysis of a Reject signal, start/expiration monitoring of a timer based on a timer value, re-origination inhibition control according to an operation instruction and a timer value, and the like.

<Operation Flow>

In the following, operations of the UE 10 on the before-mentioned backoff timer operation examples 1-1-3 are described with reference to flowcharts. The operation indicated in each flowchart is mainly executed by the operation control unit 13 in the UE 10. In the operation examples described below, operation (existing operation) in a case where the Reject signal does not include a timer value or an operation instruction of the present embodiment is also considered.

Figure 10:
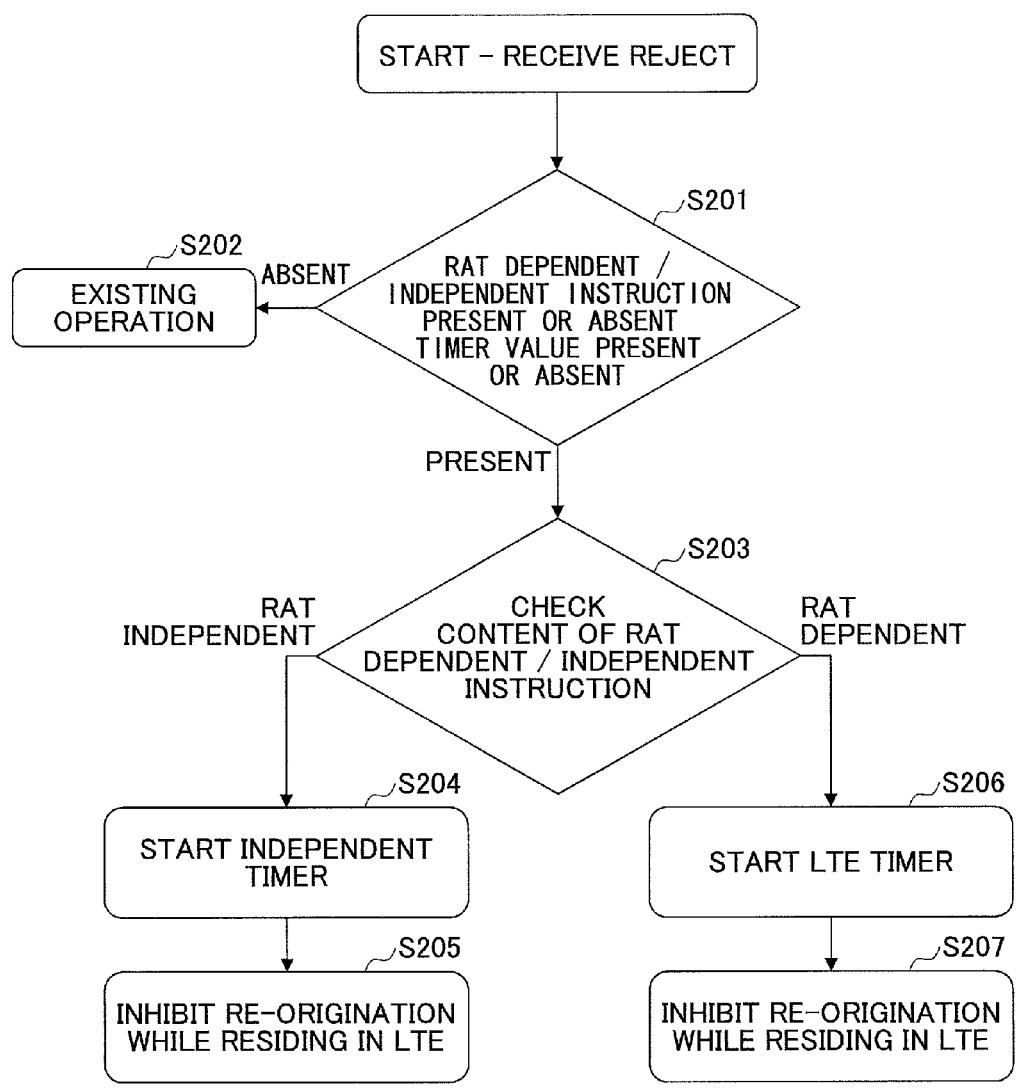
FIG. 10 is a flowchart showing operation when an LTE residing UE receives a Reject in a backoff timer operation example 1-1.

FIG. 10 is a flowchart showing operation when receiving a Reject signal in a case where the UE 10 is residing in LTE in the backoff timer operation example 1-1. As described before, in the backoff timer operation example 1-1, when a timer value is notified from the communication control apparatus 100 to the UE 10, a timer value of RAT independent and a timer value of RAT dependent (an LTE timer value and a 3G timer value in the present example) are notified.

The UE 10 that receives the Reject signal checks presence or absence of an operation instruction (RAT dependent/RAT independent), and presence or absence of a timer value in step 201. Since the new operation in the present embodiment is based on the premise that there are an operation instruction and a timer value, when any one of the operation instruction and the timer value does not exist, the process goes to step 202, so that existing operation is executed.

When there are both of the operation instruction and the timer value, the process goes to step 203, so that the UE 10 checks content of the operation instruction. When the operation instruction is RAT independent, the process goes to step 204, so that the UE 10 starts only the RAT independent timer. To start a RAT independent timer is to start a timer that expires when a period of the RAT independent timer value elapses. Same applies to other timers. After the RAT independent timer starts in step 204, re-origination is inhibited while the timer is running (before expiration).

When the operation instruction is RAT dependent as a result of check in step 203, the process goes to step 206, so that the UE 10 starts an LTE timer which is a timer of LTE which is the current residing RAT. After the LTE timer starts in step 206, re-origination is inhibited while the timer is running (before expiration) and while the UE 10 resides in LTE that is the current RAT.

Figure 11:
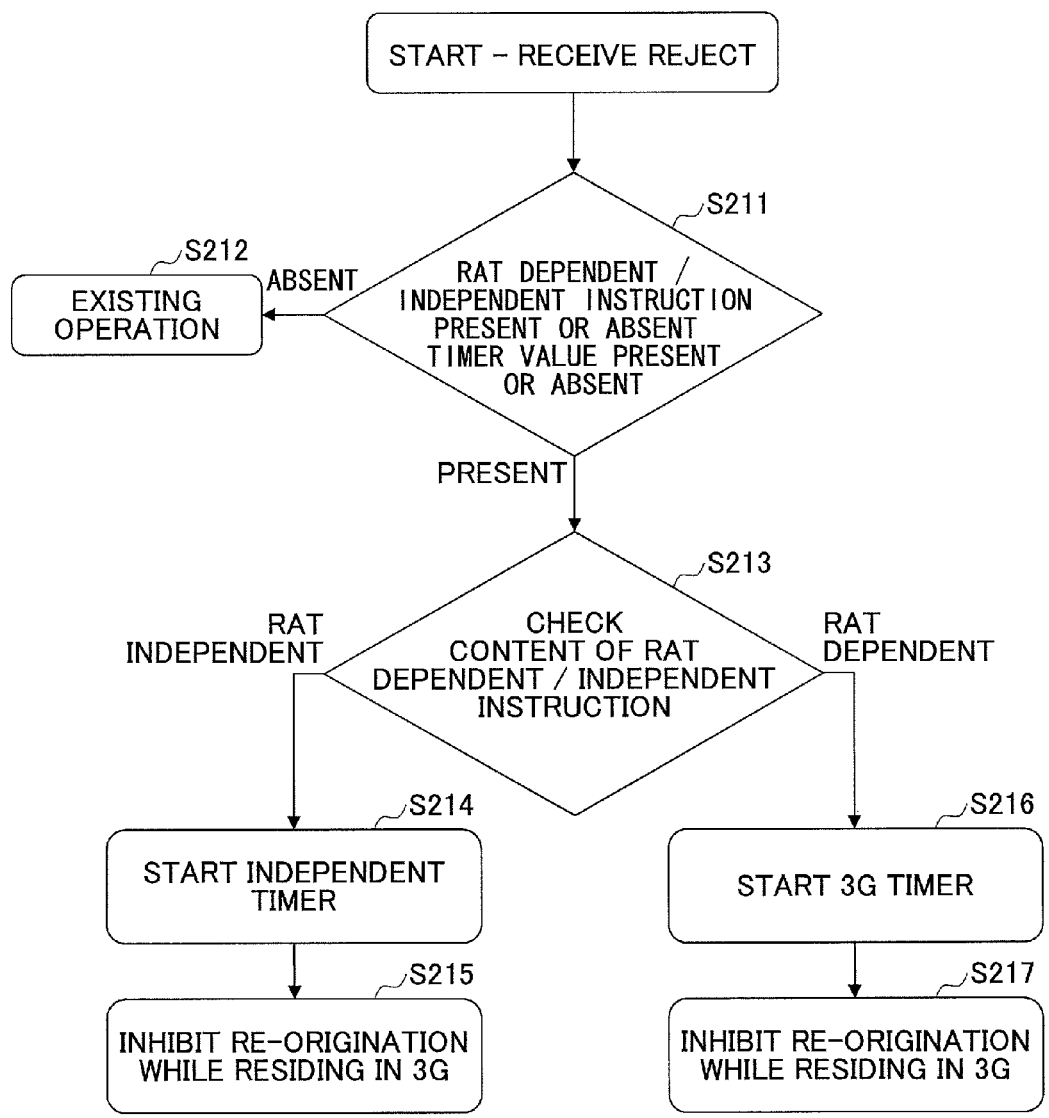
FIG. 11 is a flowchart showing operation when a 3G residing UE receives a Reject in a backoff timer operation example 1-1.

FIG. 11 is a flowchart showing operation when receiving a Reject signal in a case where the UE 10 is residing in 3G in the backoff timer operation example 1-1.

The UE 10 that receives the Reject signal checks presence or absence of an operation instruction (RAT dependent/RAT independent), and presence or absence of a timer value in step 211. When any one of the operation instruction and the timer value does not exist, the process goes to step 212, so that existing operation is executed.

When there are both of the operation instruction and the timer value, the process goes to step 213, so that the UE 10 checks content of the operation instruction. When the operation instruction is RAT independent, the process goes to step 214, so that the UE 10 starts the RAT independent timer. After the RAT independent timer starts in step 214, re-origination is inhibited while the timer is running (before expiration) in step 215.

When the operation instruction is RAT dependent as a result of check in step 213, the process goes to step 216, so that the UE 10 starts only a 3G timer which is a timer of 3G which is the current residing RAT. After the 3G timer starts in step 216, re-origination is inhibited while the timer is running (before expiration) and while the UE 10 resides in 3G that is the current RAT.

Figure 12:
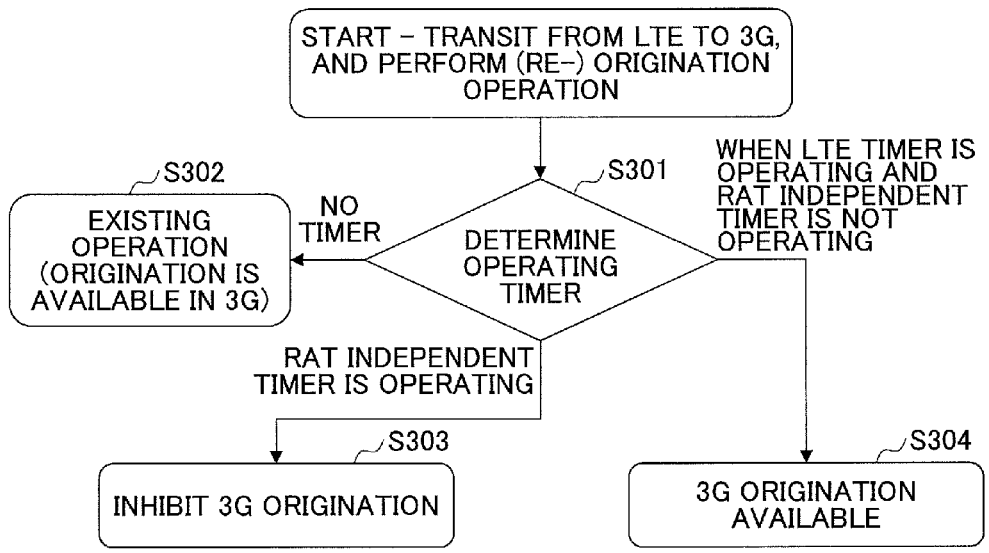
FIG. 12 is a flowchart showing operation when an LTE residing UE changes RAT in a backoff timer operation example 1-1.

FIG. 12 is a flowchart showing operation in a case where the UE 10 performed RAT change from LTE to 3G in the backoff timer operation example 1-1.

In step 301, the UE 10 performs determination of an operating timer. When there is no timer, the process goes to step 302, so that the UE 10 performs existing operation. When a RAT independent timer is running as a result of determination in step 301, the process goes to step 303, so that the UE 10 inhibits origination (re-origination) in 3G. As a result of determination in step 301, when an LTE timer is running (before expiration) and the RAT independent time is not running, the process goes to step 304, so that the UE 10 stops the LTE timer to perform origination (re-origination) in 3G. In the above-mentioned processing, the event that the RAT independent timer is running is based on that the operation instruction is RAT independent, and the event that the RAT dependent timer is running is based on that the operation instruction is RAT dependent. That is, re-origination inhibition operation after RAT transition of the UE 10 is determined based on the operation instruction before RAT transition.

Figure 13:
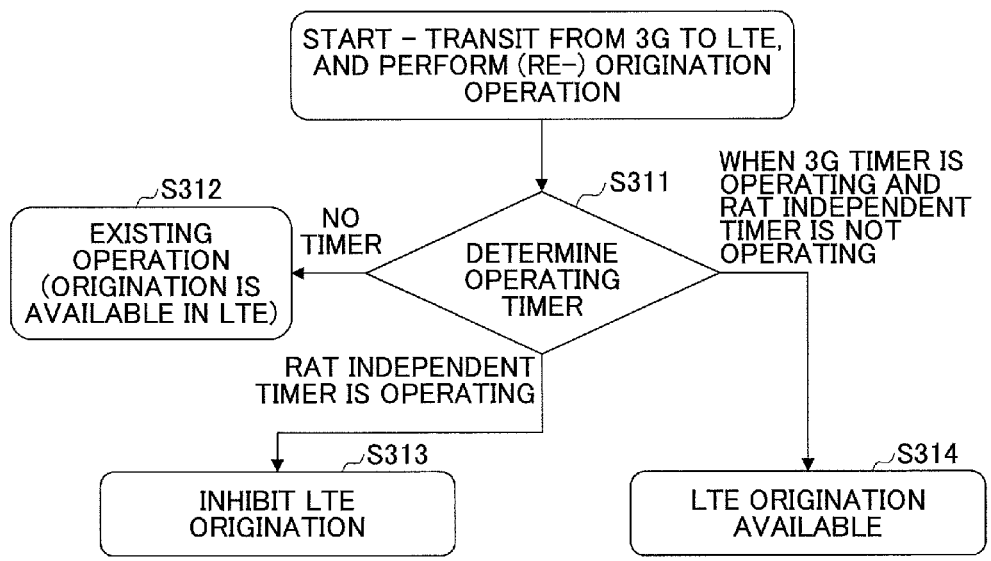
FIG. 13 is a flowchart showing operation when a 3G residing UE changes RAT in a backoff timer operation example 1-1.

FIG. 13 is a flowchart showing operation in a case where the UE 10 performed RAT change from 3G to LTE in the backoff timer operation example 1-1.

In step 311, the UE 10 performs determination of an operating timer. When there is no timer, the process goes to step 312, so that the UE 10 performs existing operation. When a RAT independent timer is running (before expiration) as a result of determination in step 311, the process goes to step 313, so that the UE 10 inhibits origination (re-origination) in LTE. As a result of determination in step 311, when a 3G timer is running and the RAT independent time is not running, the process goes to step 314, so that the UE 10 stops the 3G timer to perform origination (re-origination) in LTE.

Figure 14:
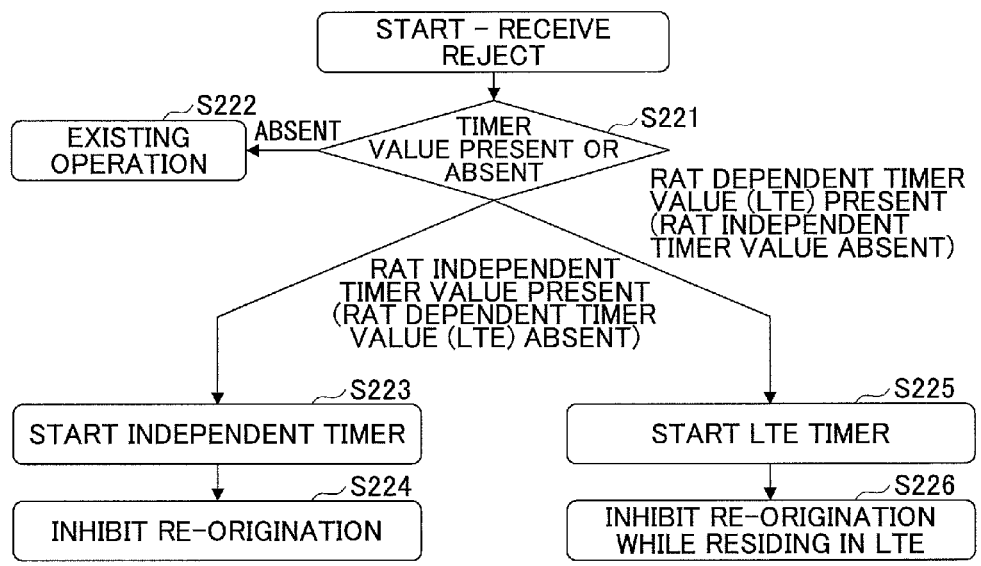
FIG. 14 is a flowchart showing operation when an LTE residing UE receives a Reject in a backoff timer operation example 1-2.

FIG. 14 is a flowchart indicating operation when receiving a Reject signal in a case where the UE 10 is residing in LTE in the backoff timer operation example 1-2. As described before, in the backoff timer operation example 1-2, a timer value is notified from the communication control apparatus 100 to the UE 10 without notification of an operation instruction using a new information element. The UE 10 determines whether RAT dependent is instructed or RAT independent is instructed based on a received timer value.

The UE 10 that receives the Reject signal checks presence or absence of a timer value in step 221. When there is no timer value, the process goes to step 222, so that the UE 10 executes existing operation.

When there is a RAT independent timer value but there is not a RAT dependent timer value (LTE timer value) in the Reject signal, the UE 10 determines that a RAT independent instruction is received, so that the process goes to step 223 and the UE 10 starts the RAT independent timer. After the RAT independent timer starts in step 223, re-origination is inhibited while the timer is running (before expiration) in step 224.

When there is a RAT dependent timer value (LTE timer value) but there is not a RAT independent timer value in the Reject signal, the UE 10 determines that a RAT dependent instruction is received, so that the process goes to step 225 and the UE 10 starts the LTE timer. After the LTE timer starts in step 225, re-origination is inhibited while the timer is running (before expiration) and while the UE 10 is residing in LTE in step 226.

Figure 15:
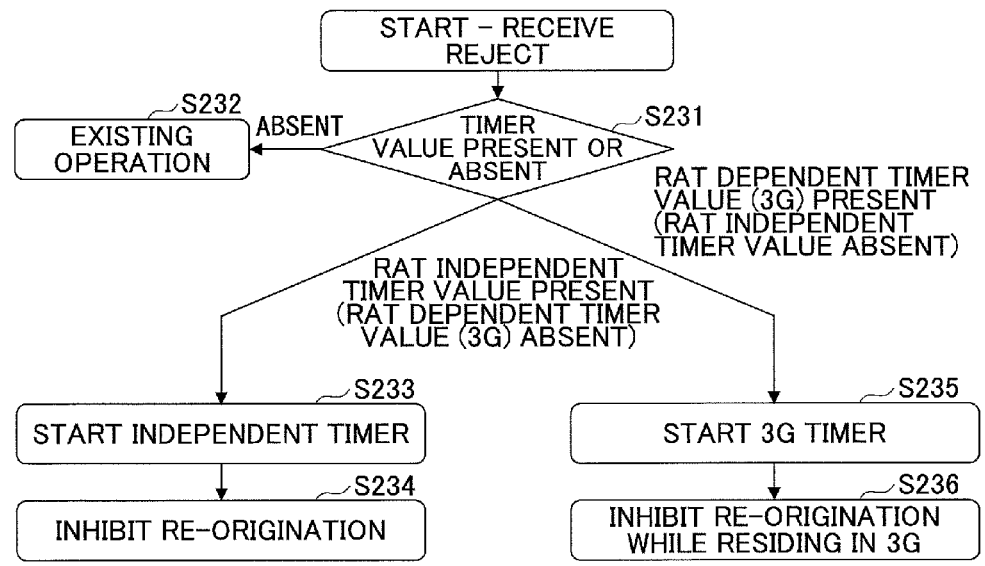
FIG. 15 is a flowchart showing operation when a 3G residing UE receives a Reject in a backoff timer operation example 1-2.

FIG. 15 is a flowchart indicating operation when receiving a Reject signal in a case where the UE 10 is residing in 3G in the backoff timer operation example 1-2.

The UE 10 that receives the Reject signal checks presence or absence of a timer value in step 231. When there is no timer value, the process goes to step 232, so that the UE 10 executes existing operation.

When there is a RAT independent timer value but there is not a RAT dependent timer value (3G timer value) in the Reject signal, the UE 10 determines that a RAT independent instruction is received, so that the process goes to step 233 and the UE 10 starts the RAT independent timer. After the RAT independent timer starts in step 233, re-origination is inhibited while the timer is running (before expiration) in step 234.

When there is a RAT dependent timer value (3G timer value) but there is not a RAT independent timer value in the Reject signal, the UE 10 determines that a RAT dependent instruction is received, so that the process goes to step 235 and the UE 10 starts the 3G timer. After the 3G timer starts in step 235, re-origination is inhibited while' the timer is running (before expiration) and while the UE 10 is residing in 3G in step 236.

Figure 16:
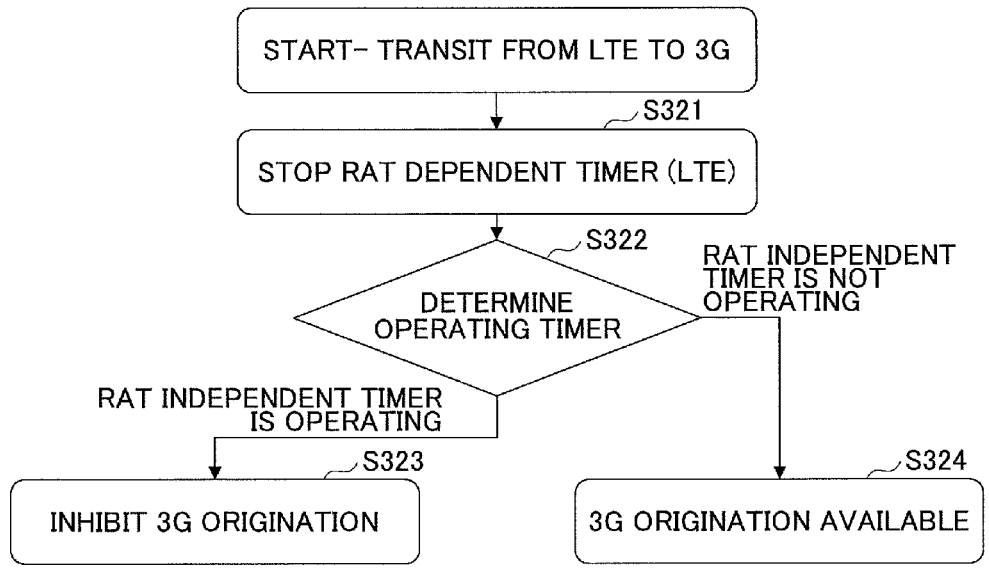
FIG. 16 is a flowchart showing operation when an LTE residing UE changes RAT in a backoff timer operation example 1-2.

FIG. 16 is a flowchart showing operation in a case where the UE 10 performed RAT change from LTE to 3G in the backoff timer operation example 1-2.

In step 321, the UE 10 stops a RAT dependent timer (LTE timer) if it is operating. In step 322, the UE 10 performs determination of operating timer. When a RAT independent timer is running as a result of determination in step 322, the process goes to step 323, so that the UE 10 inhibits origination (re-origination) in 3G. As a result of determination of step 322, when the RAT independent timer is not running, the process goes to step 324, so that the UE 10 performs origination (re-origination) in 3G.

Figure 17:
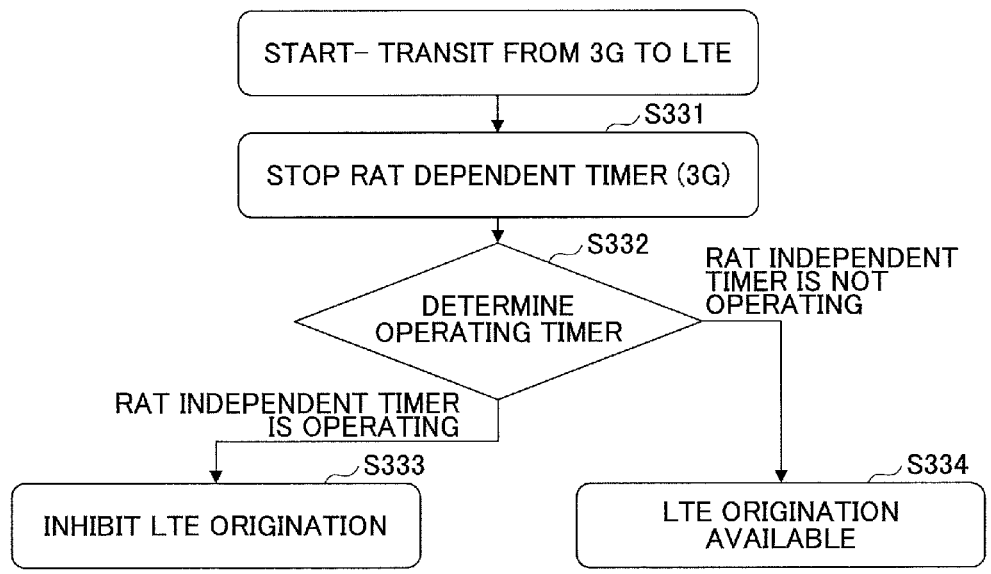
FIG. 17 is a flowchart showing operation when a 3G residing UE changes RAT in a backoff timer operation example 1-2.

FIG. 17 is a flowchart showing operation in a case where the UE 10 performed RAT change from 3G to LTE in the backoff timer operation example 1-2.

In step 331, the UE 10 stops a RAT dependent timer (3G timer) if it is operating. In step 332, the UE 10 performs determination of operating timer. When a RAT independent timer is running as a result of determination in step 332, the process goes to step 333, so that the UE 10 inhibits origination (re-origination) in LTE. As a result of determination of step 332, when the RAT independent timer is not running, the process goes to step 334, so that the UE 10 performs origination (re-origination) in LTE.

Figure 18:
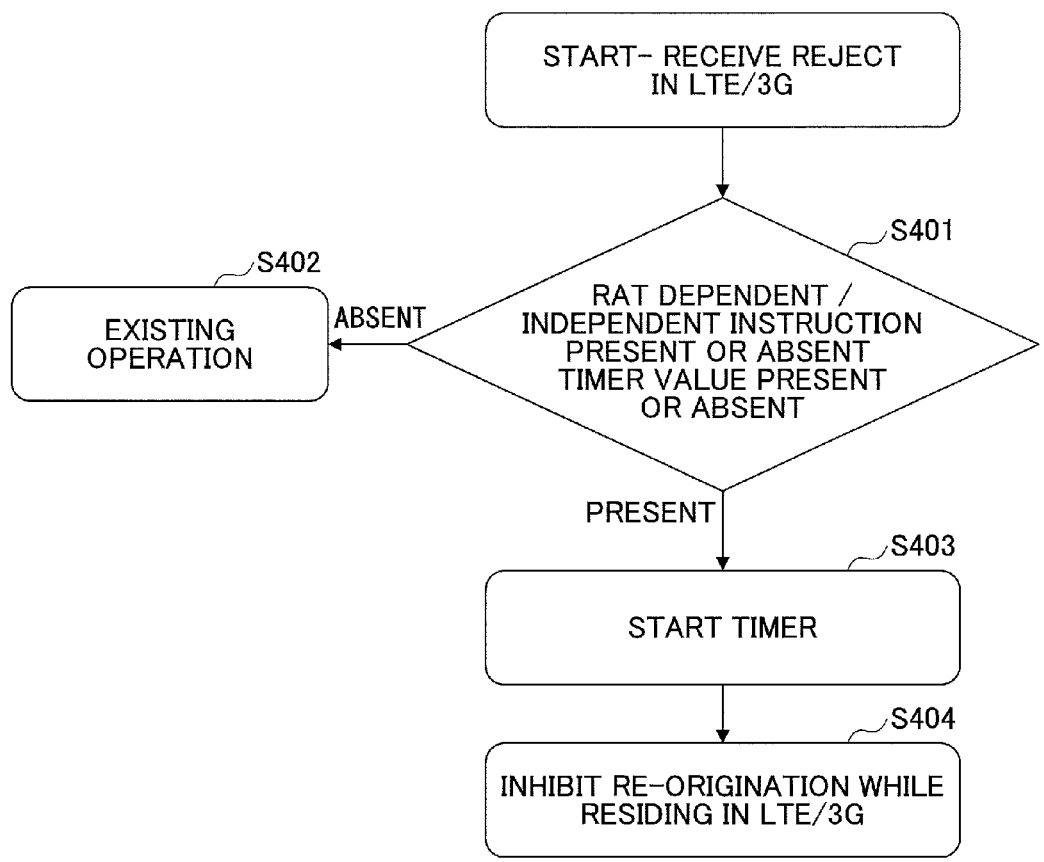
FIG. 18 is a flowchart showing operation when a UE receives a Reject in a backoff timer operation example 2.

FIG. 18 is a flowchart showing operation when receiving a Reject signal in a case where the UE 10 is residing in LTE (or 3G) in the backoff timer operation example 2. As described before, in the backoff timer operation example 2, when a timer value is notified from the communication control apparatus 100 to the UE 10, one timer value is notified.

The UE 10 that receives the Reject signal checks presence or absence of an operation instruction (RAT dependent/RAT independent), and presence or absence of a timer value in step 401. When any of the operation instruction and the timer value does not exist, the process goes to step 402, so that existing operation is executed.

When there are both of the operation instruction and the timer value, the process goes to step 403, so that the UE 10 starts a timer. After the UE 10 starts the timer in step 403, the UE 10 inhibits re-origination while the timer is running (before expiration) and while the UE 10 is residing in LTE (or 3G) which is the current RAT.

Figure 19:
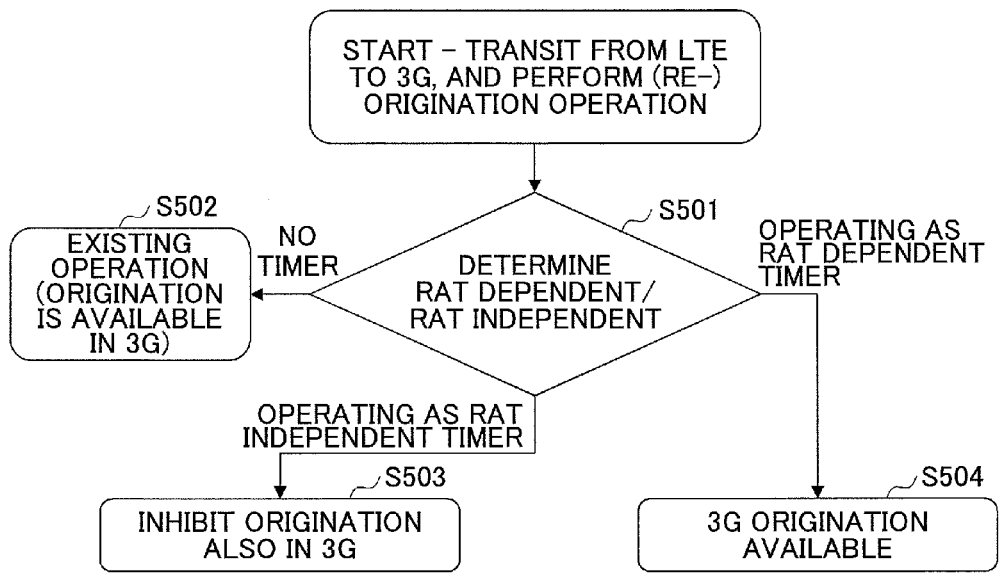
FIG. 19 is a flowchart showing operation when an LTE residing UE changes RAT in a backoff timer operation example 2.

FIG. 19 is a flowchart showing operation in a case where the UE 10 performed RAT change from LTE to 3G in the backoff timer operation example 2.

In step 501, the UE 10 performs determination of an operation instruction (RAT independent/RAT dependent). This determination is also determination of operating timer to determine whether the one timer that is currently running is running as a RAT independent timer or is running as a RAT dependent timer (timer of a RAT before RAT change).

When there is no timer, the process goes to step 502, so that the UE 10 performs existing operation. As a result of determination in step 501, when the operation instruction is RAT independent and the timer is running as a RAT independent timer (before expiration), the process goes to step 503, so that the UE 10 inhibits origination (re-origination) in 3G. As a result of determination in step 501, when the operation instruction is RAT dependent and the timer is running as a RAT dependent timer (LTE timer) (before expiration), the process goes to step 504, so that the UE 10 stops the timer to perform origination (re-origination) in 3G.

Figure 20:
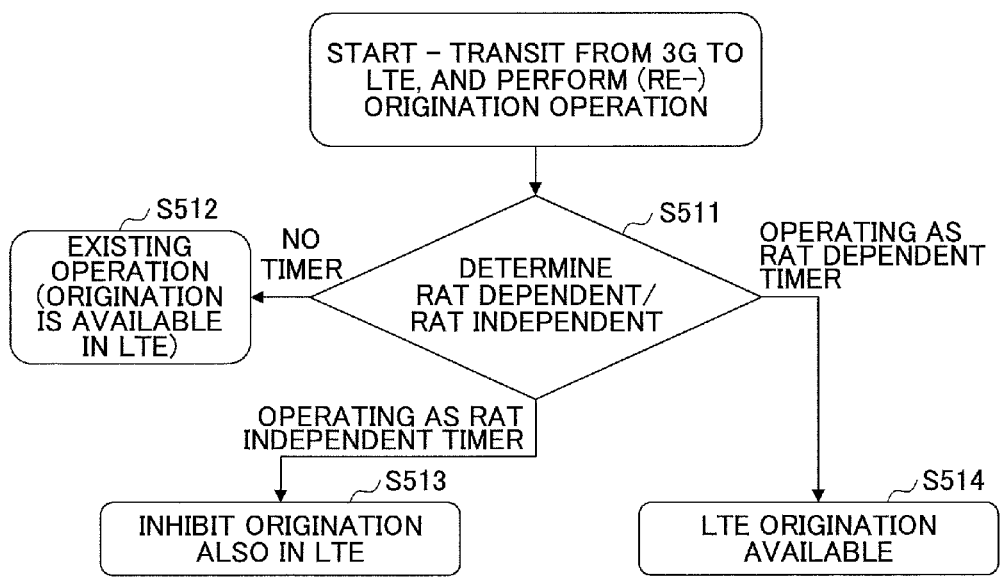
FIG. 20 is a flowchart showing operation when a 3G residing UE changes RAT in a backoff timer operation example 2.

FIG. 20 is a flowchart showing operation in a case where the UE 10 performed RAT change from 3G to LTE in the backoff timer operation example 2.

In step 511, the UE 10 performs determination of an operation instruction (RAT independent/RAT dependent). When there is no timer, the process goes to step 512, so that the UE 10 performs existing operation. As a result of determination in step 511, when the operation instruction is RAT independent and the timer is running as a RAT independent timer (before expiration), the process goes to step 513, so that the UE 10 inhibits origination (re-origination) in LTE. As a result of determination in step 511, when the operation instruction is RAT dependent and the timer is running as a RAT dependent timer (3G timer) (before expiration), the process goes to step 514, so that the UE 10 stops the timer to perform origination (re-origination) in LTE.

Figure 21:
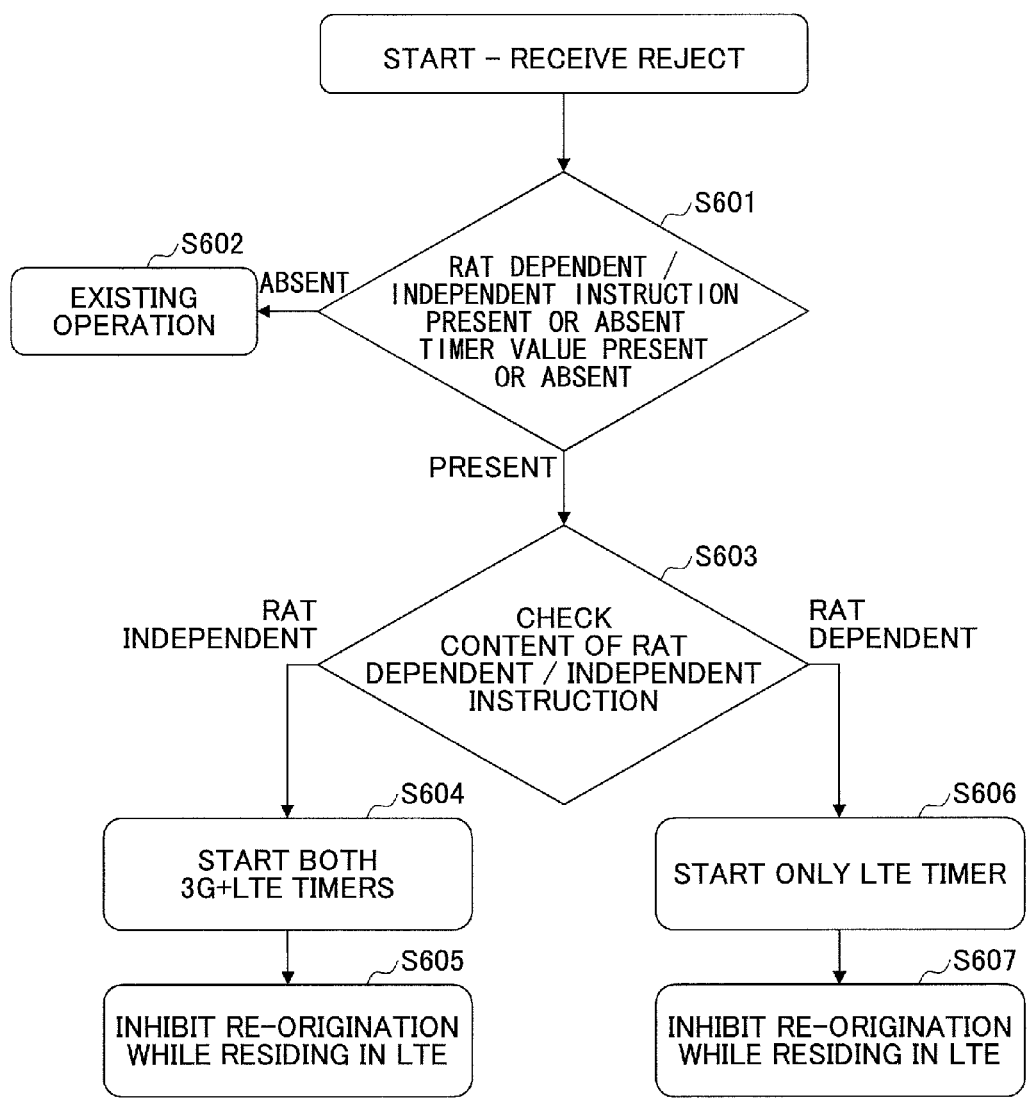
FIG. 21 is a flowchart showing operation when an LTE residing UE receives a Reject in a backoff timer operation example 3.

FIG. 21 is a flowchart showing operation when receiving a Reject signal in a case where the UE 10 is residing in LTE in the backoff timer operation example 3. As described before, in the backoff timer operation example 3, when a timer value is notified from the communication control apparatus 100 to the UE 10, only timer values of RAT dependent (an LTE timer value and a 3G timer value in the present example) are notified.

The UE 10 that receives the Reject signal checks presence or absence of an operation instruction (RAT dependent/RAT independent), and presence or absence of a timer value in step 601. When any one of the operation instruction and the timer, value does not exist, the process goes to step 602, so that existing operation is executed.

When there are both of the operation instruction and the timer value, the process goes to step 603, so that the UE 10 checks content of the operation instruction. When the operation instruction is RAT independent, the process goes to step 604, so that the UE 10 starts both of the 3G timer and the LTE timer. After starting both timers in step 604, the UE 10 inhibits re-origination while the LTE timer which is the current RAT timer is running (before expiration) and while the UE 10 is residing in LTE.

When the operation instruction is RAT dependent as a result of check in step 603, the process goes to step 606, so that the UE 10 starts only the LTE timer which is a current RAT timer. After the LTE timer starts in step 606, re-origination is inhibited while the timer is running (before expiration) and while the UE 10 resides in LTE that is the current RAT in step 607.

Figure 22:
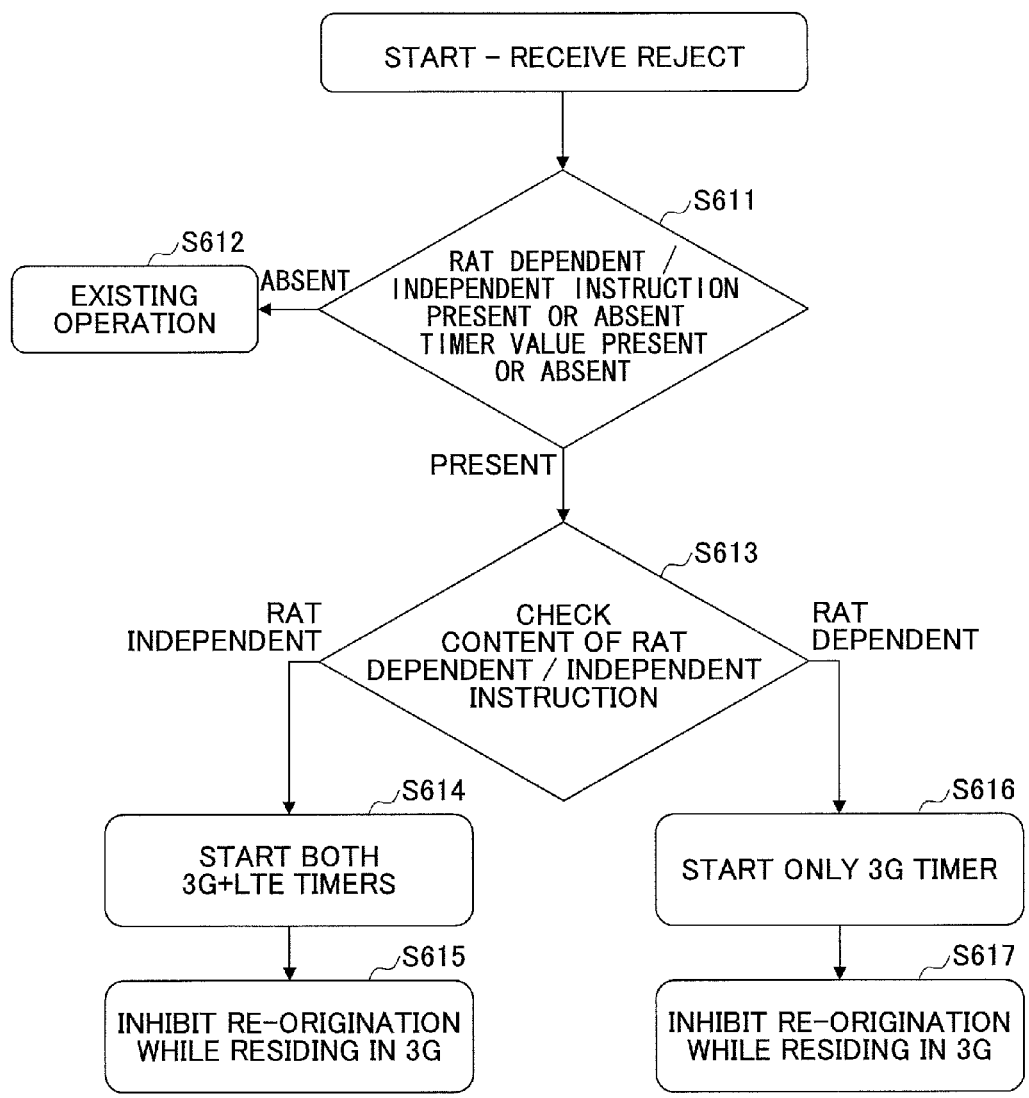
FIG. 22 is a flowchart showing operation when a 3G residing UE receives a Reject in a backoff timer operation example 3.

FIG. 22 is a flowchart showing operation when receiving a Reject signal in a case where the UE 10 is residing in 3G in the backoff timer operation example 3.

The UE 10 that receives the Reject signal checks presence or absence of an operation instruction (RAT dependent/RAT independent), and presence or absence of a timer value in step 611. When any one of the operation instruction and the timer value does not exist, the process goes to step 612, so that existing operation is executed.

When there are both of the operation instruction and the timer value, the process goes to step 613, so that the UE 10 checks content of the operation instruction. When the operation instruction is RAT independent, the process goes to step 614, so that the UE 10 starts both of the 3G timer and the LTE timer. After starting both timers in step 614, the UE 10 inhibits re-origination while the 3G timer which is the current RAT timer is running (before expiration) and while the UE 10 is residing in 3G.

When the operation instruction is RAT dependent as a result of check in step 613, the process goes to step 616, so that the UE 10 starts only the 3G timer which is a current RAT timer. After the 3G timer starts in step 616, re-origination is inhibited while the timer is running (before expiration) and while the UE 10 resides in 3G that is the current RAT in step 617.

Figure 23:
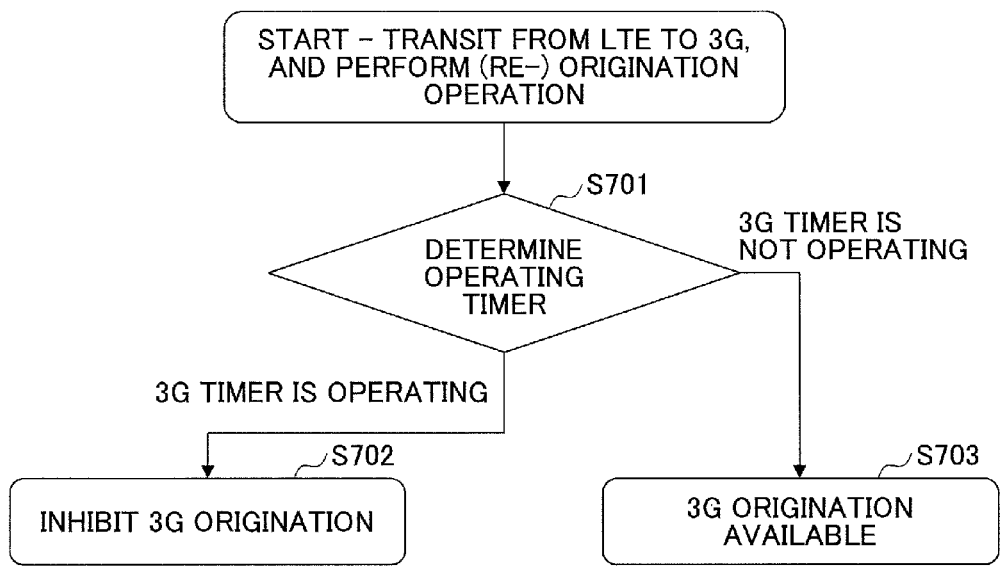
FIG. 23 is a flowchart showing operation when an LTE residing UE changes RAT in a backoff timer operation example 3.

FIG. 23 is a flowchart showing operation in a case where the UE 10 performed RAT change from LTE to 3G in the backoff timer operation example 3.

In step 701, the UE 10 performs determination of operating timer. When the 3G timer is running (before expiration) as a result of determination in step 701, the process goes to step 702, so that the UE 10 inhibits origination (re-origination) in 3G. As a result of determination of step 701, when the 3G timer is not operating, the process goes to step 703, so that the UE 10 stops the LTE timer and performs origination (re-origination) in 3G.

Figure 24:
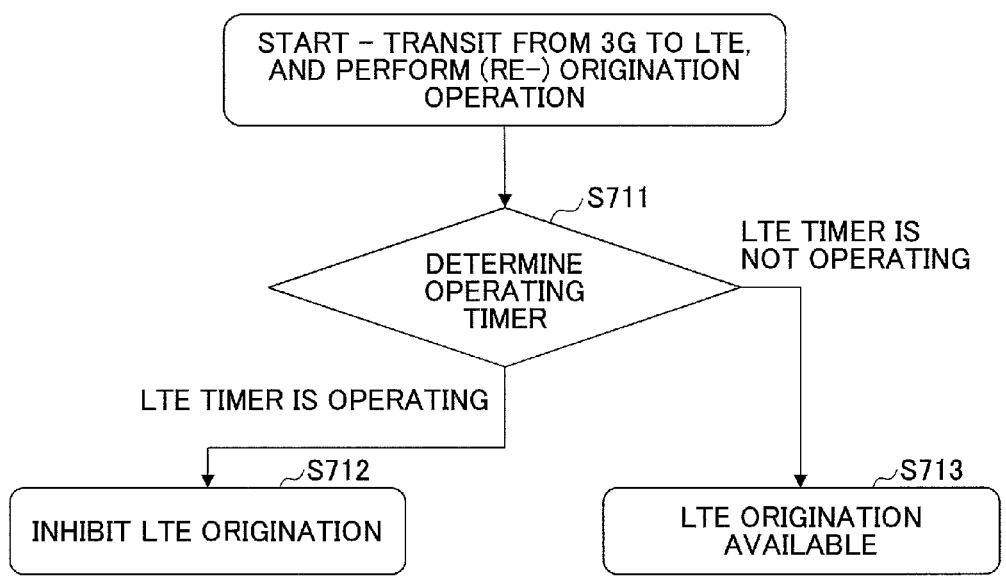
FIG. 24 is a flowchart showing operation when a 3G residing UE changes RAT in a backoff timer operation example 3.

FIG. 24 is a flowchart showing operation in a case where the UE 10 performed RAT change from 3G to LTE in the backoff timer operation example 3.

In step 711, the UE 10 performs determination of operating timer. When the LTE timer is running (before expiration) as a result of determination in step 711, the process goes to step 712, so that the UE 10 inhibits origination (re-origination) in LTE. As a result of determination of step 711, when the LTE timer is not operating, the process goes to step 713, so that the UE 10 stops the 3G timer and performs origination (re-origination) in LTE.

Configurations (functional segmentation of the apparatuses shown in FIG. 8 and FIG. 9 are merely examples. As long as processing described in the present embodiment can be realized, the implementation method (concrete placement of functional units, and the like) is not limited to a particular implementation method. For example, the user apparatus (UE) and the communication control apparatus can be also configured as follows.

That is, the user apparatus in the present embodiment is configured as a user apparatus for use in a mobile communication network that supports a plurality of radio access technologies, including:

a reception unit configured, when an origination request transmitted to the mobile communication network from the user apparatus that uses a first radio access technology is rejected, to receive an origination rejection signal including a timer value and an operation instruction from the mobile communication network; and an operation control unit configured to perform inhibition of re-origination based on the timer value included in the origination rejection signal that is received by the reception unit, wherein, in a case where the user apparatus changes a using radio access technology from the first radio access technology to a second radio access technology, the operation control unit determines whether to inhibit re-origination based on the operation instruction included in the origination rejection signal.

According to the above-mentioned configuration, it is possible to provided a technique that enables to properly control operation of re-origination inhibition when a user apparatus performs RAT transition, in a mobile communication system that inhibits re-origination from the user apparatus by using a timer when origination from the user apparatus is rejected.

The operation instruction is, for example, a radio access technology dependent instruction to cause to perform re-origination inhibition operation depending on a radio access technology that the user apparatus uses, or a radio access technology independent instruction to cause to perform re-origination inhibition operation independently of a radio access technology that the user apparatus uses. According to this configuration, the user apparatus can clearly ascertain whether to perform re-origination inhibition operation in a RAT dependent manner or in a RAT independent manner.

In a case where the user apparatus changes a using radio access technology from the first radio access technology to the second radio access technology, when the operation instruction is the radio access technology dependent instruction, the operation control unit does not inhibit re-origination, and when the operation instruction is the radio access technology independent instruction, the operation control unit performs inhibition of re-origination based on a timer value. According to this configuration, the user apparatus can properly perform re-origination inhibition operation based on an instruction, and the mobile communication network can properly control re-origination inhibition operation when the user apparatus changes RAT.

The origination rejection signal includes an independent timer value that is independent of radio access technologies and a dependent timer value for each radio access technology, and wherein, when the operation instruction is the radio access technology dependent instruction, the operation control unit uses a dependent timer value corresponding to the first radio access technology that the user apparatus uses, and when the operation instruction is the radio access technology independent instruction, the operation control unit uses the independent timer value. According to this configuration, the user apparatus can use a timer value adapted for the operation instruction.

The origination rejection signal includes a dependent timer value for each radio access technology as the timer value, and wherein, when the operation instruction is the radio access technology dependent instruction, the operation control unit may use a dependent timer value corresponding to the first radio access technology that the user apparatus uses, and when the operation instruction is the radio access technology independent instruction, the operation control unit may use both of a dependent timer value corresponding to the first radio access technology and a dependent timer value corresponding to the second radio access technology. According to this configuration, the user apparatus can use a timer value adapted for the operation instruction.

Also, the communication control apparatus in the present embodiment is configured as a communication control apparatus corresponding to a first radio access technology in a mobile communication network that supports a plurality of radio access technologies, including:

a reception unit configured to receive an origination request transmitted from a user apparatus that uses the first radio access technology; and an origination rejection control unit configured, when rejecting the origination request, to generate an origination rejection signal including an operation instruction and a timer value for causing the user apparatus to inhibit re-origination, and to transmit the origination rejection signal to the user apparatus, wherein the operation instruction is an instruction that is used for causing the user apparatus to determine whether to inhibit re-origination in a case where the user apparatus changes a using radio access technology from the first radio access technology to a second radio access technology.

According to the above configuration, it is possible to provide a technique that enables to properly control operation of re-origination inhibition when a user apparatus performs RAT transition, in a mobile communication system that inhibits re-origination from the user apparatus by using a timer when origination from the user apparatus is rejected.

The operation instruction may be explicitly notified, or may be implicitly notified by including information of an operation instruction in a timer value. By notifying of an operation instruction implicitly, it is possible to perform operation instruction to the user apparatus without adding a new information element.

As to configurations of the UE (user apparatus) 10 described in the present embodiment, the UE 10 that includes a CPU and a memory may be realized by executing a program by the CPU (processor), or the UE 10 may be realized by hardware such as hardware circuits including logics of processing described in the present embodiment, or the UE 10 may be configured by coexistence of a program and hardware.

As to configurations of the communication control apparatus 100 described in the present embodiment, the communication control apparatus 100 that includes a CPU and a memory may be realized by executing a program by the CPU (processor), or the communication control apparatus 100 may be realized by hardware such as hardware circuits including logics of processing described in the present embodiment, or the communication control apparatus 100 may be configured by coexistence of a program and hardware.

In the above, an embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the UE and the communication control apparatus 100 have been explained by using functional block diagrams. However, such an apparatus may be implemented in hardware, software, or a combination thereof. Each of the software that operates by a processor provided in the UE 10 and the software that operates by a processor provided in the communication control apparatus 100 may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiments and is intended to include various variations, modifications, alterations, substitutions and so on without departing from the spirit of the present invention.

The present international patent application claims priority based on Japanese patent application No. 2014-102867, filed in the JPO on May 16, 2014, and the entire contents of the Japanese patent application No. 2014-102867 are incorporated herein by reference.

DESCRIPTION OF REFERENCE SIGNS

1 UE
2 network apparatus
11 radio unit
12 communication processing unit 13 operation control unit
14 LTE function unit
15 3G function unit
20 MME (Mobile Management Entity)
30 SGSN (Serving General Packet Radio Service Support Node)
40 SGW (Serving Gateway)
50 PCRF (Policy and Charging Rules Function)
60 PGW (Packet Data Network Gateway)
70 EPC (Evolved Packet Core)
80 IMS (IP Multimedia Subsystem)
100 communication control apparatus
200 upper node apparatus
101 origination request reception unit
102 communication route setting request transmission unit
103 origination request acceptance determination unit
104 origination rejection control unit

The invention claimed is:

1. A user apparatus for use in a mobile communication network that supports a plurality of radio access technologies (RATs), comprising:
   a reception unit configured, when an origination request transmitted to the mobile communication network from the user apparatus that uses a first RAT is rejected, to receive an origination rejection signal including a timer value and an operation instruction from the mobile communication network; and
   an operation control unit configured to perform inhibition of re-origination based on the timer value included in the origination rejection signal that is received by the reception unit,
   wherein, in a case where the user apparatus changes a using RAT from the first RAT to a second RAT, the operation control unit determines whether to inhibit re-origination based on the operation instruction included in the origination rejection signal.

2. The user apparatus as claimed in claim 1, wherein the operation instruction is:
   a RAT dependent instruction to cause to perform re-origination inhibition operation depending on a RAT that the user apparatus uses, or
   a RAT independent instruction to cause to perform re-origination inhibition operation independently of a RAT that the user apparatus uses.

3. The user apparatus as claimed in claim 2, wherein, in a case where the user apparatus changes the using RAT from the first RAT to the second RAT,
   when the operation instruction is the RAT dependent instruction, the operation control unit does not inhibit re-origination, and
   when the operation instruction is the RAT independent instruction, the operation control unit performs inhibition of re-origination based on a timer value.

4. The user apparatus as claimed in claim 3, wherein the origination rejection signal includes, as the timer value, an independent timer value that is independent of RATs and a dependent timer value for each RAT, and
   wherein, when the operation instruction is the RAT dependent instruction, the operation control unit uses a dependent timer value corresponding to the first RAT that the user apparatus uses, and
   when the operation instruction is the RAT independent instruction, the operation control unit uses the independent timer value.

5. The user apparatus as claimed in claim 3, wherein the origination rejection signal includes a dependent timer value for each RAT as the timer value, and
   wherein, when the operation instruction is the RAT dependent instruction, the operation control unit uses a dependent timer value corresponding to the first RAT that the user apparatus uses, and
   when the operation instruction is the RAT independent instruction, the operation control unit uses both of a dependent timer value corresponding to the first RAT and a dependent timer value corresponding to the second RAT.

6. The user apparatus as claimed in claim 3, wherein the operation instruction is information included in a timer value in the origination rejection signal.

7. The user apparatus as claimed in claim 2, wherein the origination rejection signal includes, as the timer value, an independent timer value that is independent of RATs and a dependent timer value for each RAT, and
   wherein, when the operation instruction is the RAT dependent instruction, the operation control unit uses a dependent timer value corresponding to the first RAT that the user apparatus uses, and
   when the operation instruction is the RAT independent instruction, the operation control unit uses the independent timer value.

8. The user apparatus as claimed in claim 2, wherein the origination rejection signal includes a dependent timer value for each RAT as the timer value, and
   wherein, when the operation instruction is the RAT dependent instruction, the operation control unit uses a dependent timer value corresponding to the first RAT that the user apparatus uses, and
   when the operation instruction is the RAT independent instruction, the operation control unit uses both of a dependent timer value corresponding to the first RAT and a dependent timer value corresponding to the second RAT.

9. The user apparatus as claimed in claim 2, wherein the operation instruction is information included in a timer value in the origination rejection signal.

10. The user apparatus as claimed in claim 1, wherein the operation instruction is information included in a timer value in the origination rejection signal.

11. A communication control apparatus corresponding to a first radio access technology (RAT) in a mobile communication network that supports a plurality of RATs, comprising:
    a reception unit configured to receive an origination request transmitted from a user apparatus that uses the first RAT; and
    an origination rejection control unit configured, when rejecting the origination request, to generate an origination rejection signal including an operation instruction and a timer value for causing the user apparatus to inhibit re-origination, and to transmit the origination rejection signal to the user apparatus,
    wherein the operation instruction is an instruction that is used for causing the user apparatus to determine whether to inhibit re-origination in a case where the user apparatus changes a using RAT from the first RAT to a second RAT.

12. The communication control apparatus as claimed in claim 11, wherein the operation instruction is:
    a RAT dependent instruction to cause to perform re-origination inhibition operation depending on a RAT that the user apparatus uses, or
    a RAT independent instruction to cause to perform re-origination inhibition operation independently of a RAT that the user apparatus uses.

13. The communication control apparatus as claimed in claim 12, wherein the operation instruction is information included in a timer value in the origination rejection signal.

14. The communication control apparatus as claimed in claim 11, wherein the operation instruction is information included in a timer value in the origination rejection signal.

15. An origination rejection control method executed by a communication system including a communication control apparatus corresponding to a first radio access technology (RAT) in a mobile communication network that supports a plurality of RATs, and including a user apparatus, comprising:

a step in which the user apparatus that uses the first RAT transmits an origination request, and the communication control apparatus receives the origination request;

a step in which, when the communication control apparatus rejects the origination request, the communication control apparatus generates an origination rejection signal including an operation instruction and a timer value for causing the user apparatus to inhibit re-origination, and transmits the origination rejection signal to the user apparatus;

a step in which the user apparatus performs inhibition of re-origination by the first RAT based on the timer value included in the origination rejection signal, wherein, in a case where the user apparatus changes a using RAT from the first RAT to a second RAT, the user apparatus determines whether to inhibit re-origination based on the operation instruction included in the origination rejection signal.

\* \* \* \* \*